(12) United States Patent
Kang et al.

(10) Patent No.: US 12,003,310 B2
(45) Date of Patent: Jun. 4, 2024

(54) METHOD FOR PERFORMING BEAM FAILURE RECOVERY PROCEDURE IN WIRELESS COMMUNICATION SYSTEM, AND DEVICE THEREFOR

(71) Applicant: LG ELECTRONICS INC., Seoul (KR)

(72) Inventors: Jiwon Kang, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 17/623,359

(22) PCT Filed: Jun. 29, 2020

(86) PCT No.: PCT/KR2020/008436
§ 371 (c)(1),
(2) Date: Dec. 28, 2021

(87) PCT Pub. No.: WO2020/263049
PCT Pub. Date: Dec. 30, 2020

(65) Prior Publication Data
US 2022/0368406 A1 Nov. 17, 2022

Related U.S. Application Data

(60) Provisional application No. 62/867,932, filed on Jun. 28, 2019.

(51) Int. Cl.
*H04B 7/08* (2006.01)
*H04B 7/06* (2006.01)
(Continued)

(52) U.S. Cl.
CPC ........... *H04B 7/0888* (2013.01); *H04B 7/061* (2013.01); *H04W 72/21* (2023.01)

(58) Field of Classification Search
CPC ...... H04B 7/0888; H04B 7/061; H04B 7/022; H04B 7/0695; H04W 72/21; H04W 76/15;
(Continued)

(56) References Cited

U.S. PATENT DOCUMENTS

2019/0281480 A1 9/2019 Wei et al.
2020/0260300 A1* 8/2020 Cirik .................. H04W 72/046
(Continued)

FOREIGN PATENT DOCUMENTS

CN 109842894 6/2019
EP 3659390 6/2020
(Continued)

OTHER PUBLICATIONS

Etsi et al., "Physical layer procedures for control," 3GPP TS 38.213 version 15.6.0 Release 15, ETSI TS 138 213 v15.6.0, Jul. 2019, 112 pages.
(Continued)

*Primary Examiner* — David S Huang
(74) *Attorney, Agent, or Firm* — Fish & Richardson P.C.

(57) ABSTRACT

A method by which a terminal performs a beam failure recovery (BFR) procedure in a wireless communication system, according to one embodiment of the present specification, comprises the steps of: receiving setting information related to a physical uplink control channel (PUCCH); transmitting the PUCCH on the basis of the setting information, the PUCCH being related to BFR of at least one secondary cell (SCell); and transmitting a message comprising information related to the BFR. The message comprising the information related to the BFR is related to a beam failure detected before a specific time point.

7 Claims, 23 Drawing Sheets

(51) Int. Cl.
*H04W 72/04* (2023.01)
*H04W 72/21* (2023.01)

(58) Field of Classification Search
CPC ........... H04W 74/0833; H04W 72/046; H04W 24/04; H04W 16/28; H04W 72/23; H04L 5/0035; H04L 5/0048; H04L 5/0053; H04L 5/001; Y02D 30/70
See application file for complete search history.

(56) References Cited

U.S. PATENT DOCUMENTS

| | | |
|---|---|---|
| 2021/0022052 A1 | 1/2021 | Lee et al. |
| 2021/0105176 A1 | 4/2021 | Tsai et al. |
| 2021/0314979 A1 | 10/2021 | Agiwal et al. |
| 2022/0123823 A1 | 4/2022 | Dong et al. |
| 2022/0158794 A1* | 5/2022 | Zhang ................... H04L 5/0055 |
| 2022/0190900 A1 | 6/2022 | Berliner et al. |
| 2023/0042828 A1 | 2/2023 | Uchino et al. |

FOREIGN PATENT DOCUMENTS

| | | |
|---|---|---|
| WO | WO2017024516 | 2/2017 |
| WO | WO 2019/032882 | 2/2019 |
| WO | WO 2019/050380 | 3/2019 |
| WO | WO 2021/202724 | 10/2021 |

OTHER PUBLICATIONS

Intel Corp., "Summary 2 on L1-SINR and SCell BFR," R1-1907892, 3GPP TSG RAN WG1 Meeting #97, Reno, USA, May 13-17, 2019, 22 pages.
Intel Corp., "Summary on L1-SINR and SCell BFR," R1-1907674, 3GPP TSG RAN WG1 Meeting #97, Reno, USA, May 13-17, 2019, 22 pages.
LG Electronics Inc., "Enhanced beam failure detection operation for NR-U," R2-1906743, 3GPP TSG- RAN WG2 Meeting #106, Reno, USA, May 13-17, 2019, 2 pages.
PCT International Search Report for International Application No. PCT/KR2020/008436, dated Sep. 21, 2020, 5 pages.
CATT, "Summary on BFR detection and other BFR issues, " 3GPP TSG-RAN WG2 NR Ad hoc 0118, R2-1801558, Vancouver, Canada, Jan. 22-26, 2018, 11 pages.
Extended European Search Report in European Application No. 20830805.6, dated Jun. 14, 2022, 11 pages.
Huawei et al., "Beam failure recovery for Scell," 3GPP TSG RAN WG1 Ad-Hoc Meeting 1901, R1-1900846, Taipei, Jan. 21-25, 2019, 6 pages.
LG Electronics, "Discussion on multi-beam based operations and enhancements," 3GPP TSG RAN WG1 Meeting #95, R1-1812582, Spokane, USA, Nov. 12-16, 2018, 10 pages.
MediaTek Inc., "Revised Summary 1 on Remaing issues on Beam Failure Recovery Document for: Discussion," 3GPP TSG RAN WG1 Meeting #92bis, R1-1805583, Sanyan, China, Apr. 16-20, 2018, 17 pages.
NEC, "Remaining issues on beam failure recovery," 3GPP TSG RAN WG1 Meeting #92b, R1-1803622, Sanya, China, Apr. 16-20, 2018, 2 pages.
Nokia et al., "Beam failure detection and recovery," 3GPP TSG-RAN WG2 Meeting #101, R2-1803230, Athens, Greece, Feb. 26-Mar. 2, 2018, 13 pages.
Office Action in Korean Application No. 10-2021-7042905, dated Apr. 29, 2022, 10 pages (with English translation).
Office Action in U.S. Appl. No. 18/095,909, dated Apr. 12, 2023, 9 pages.
Notice of Allowance in Chinese Appln. No. 202080047453.3, mailed on Nov. 24, 2023, 7 pages (with English translation).

* cited by examiner

[FIG. 1]
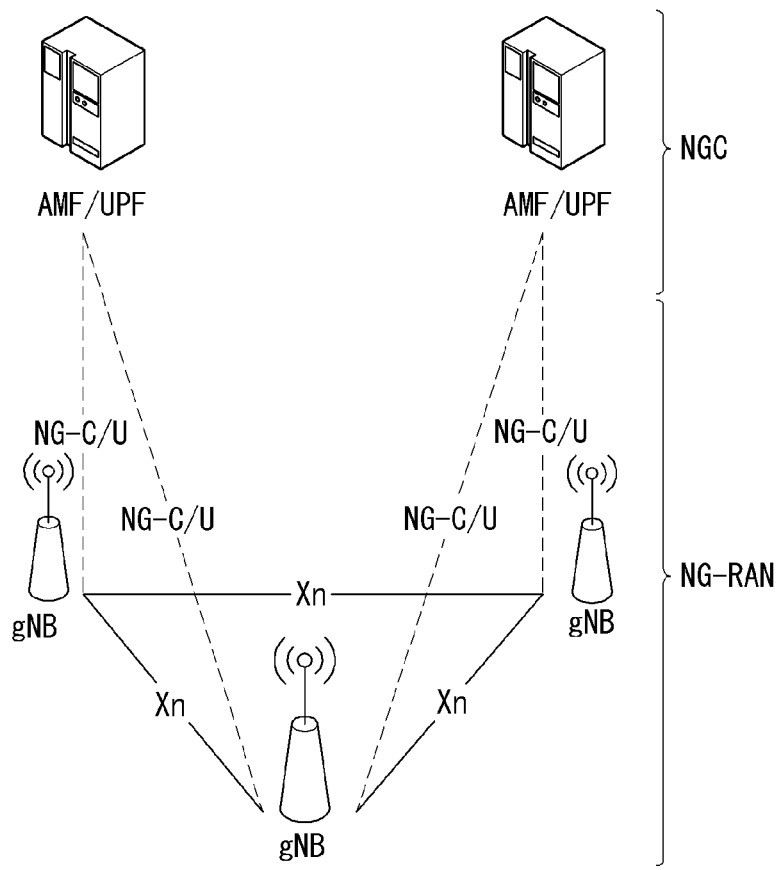
[FIG. 2]
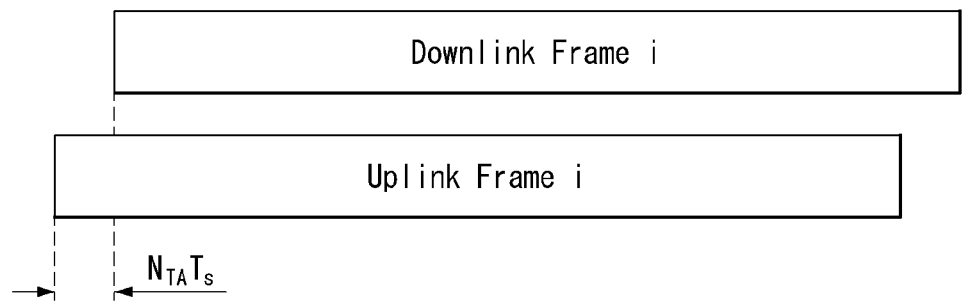

[FIG. 3]
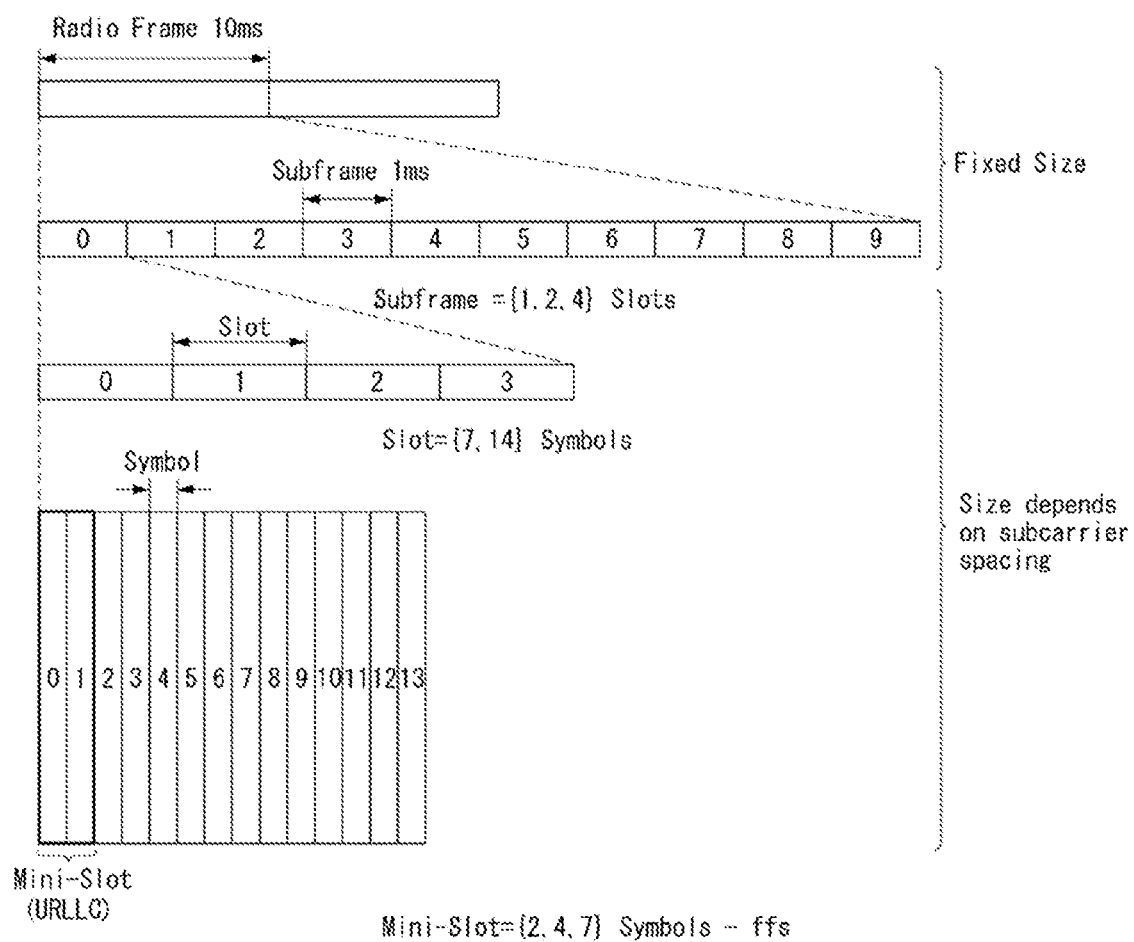

[FIG. 4]
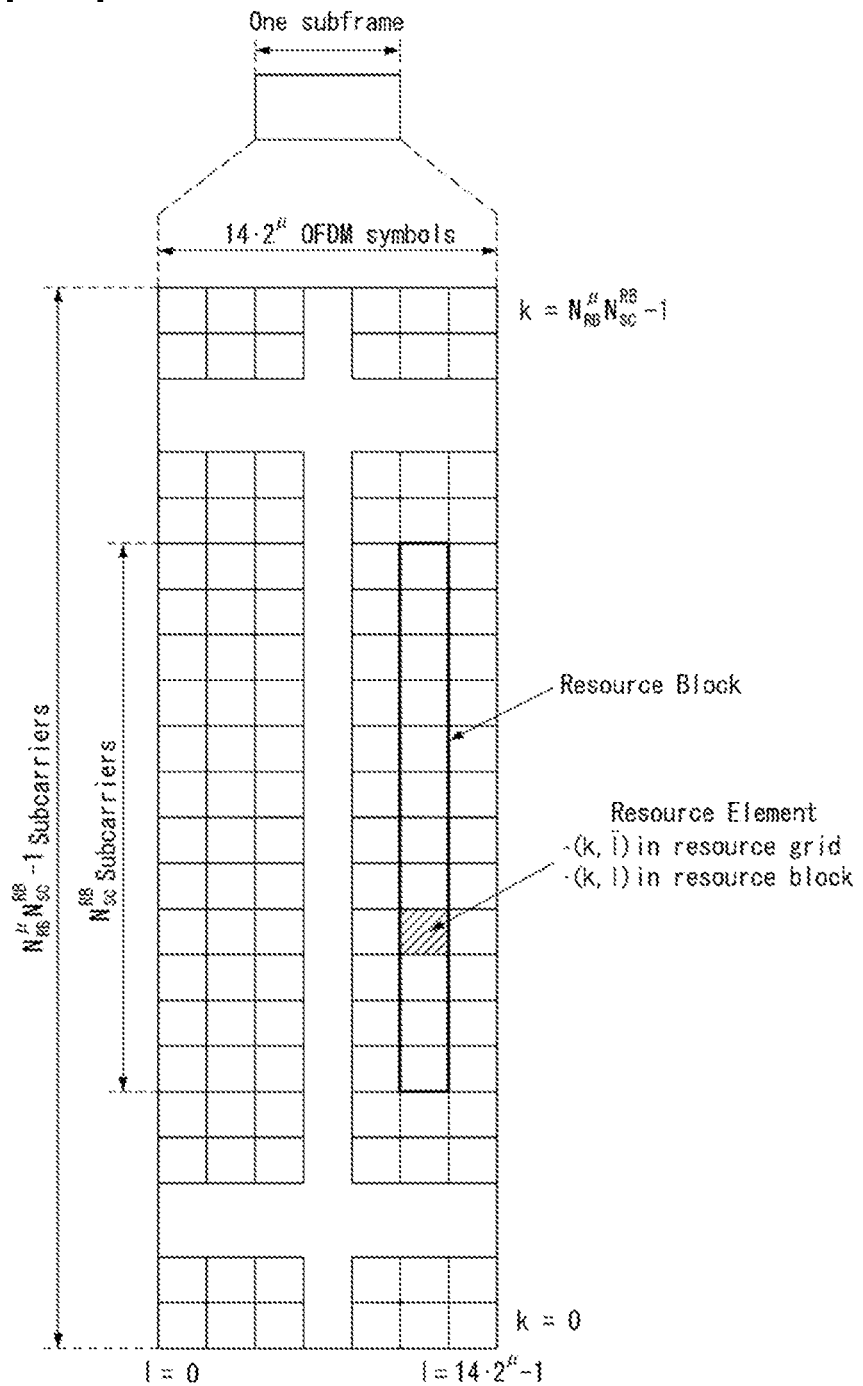

[FIG. 5]
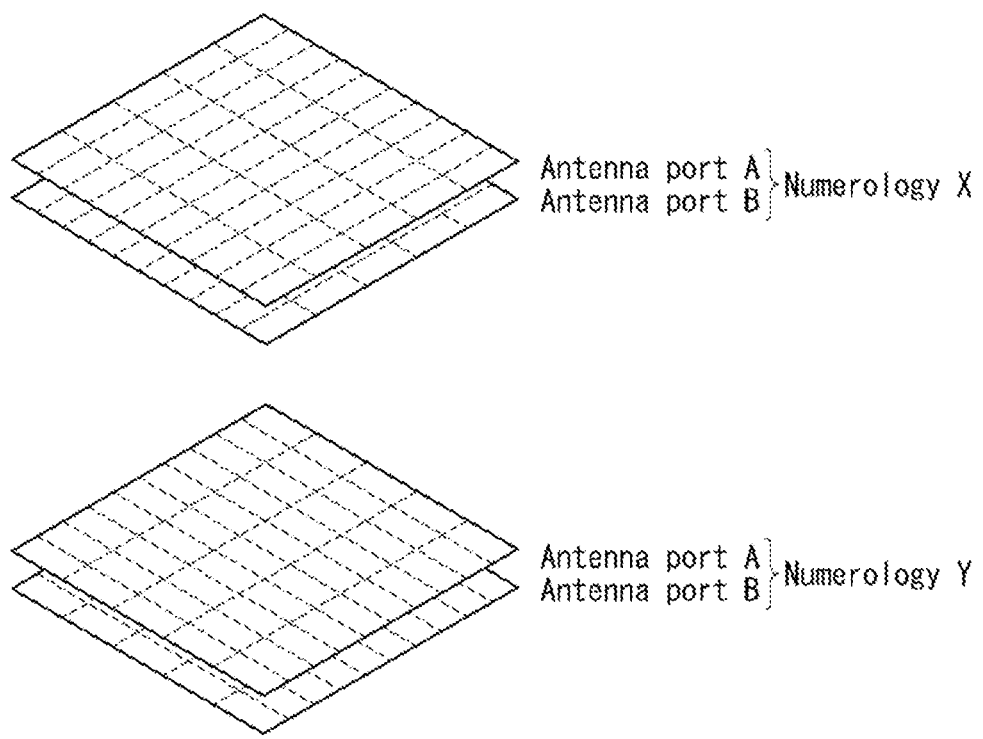

[FIG. 6]
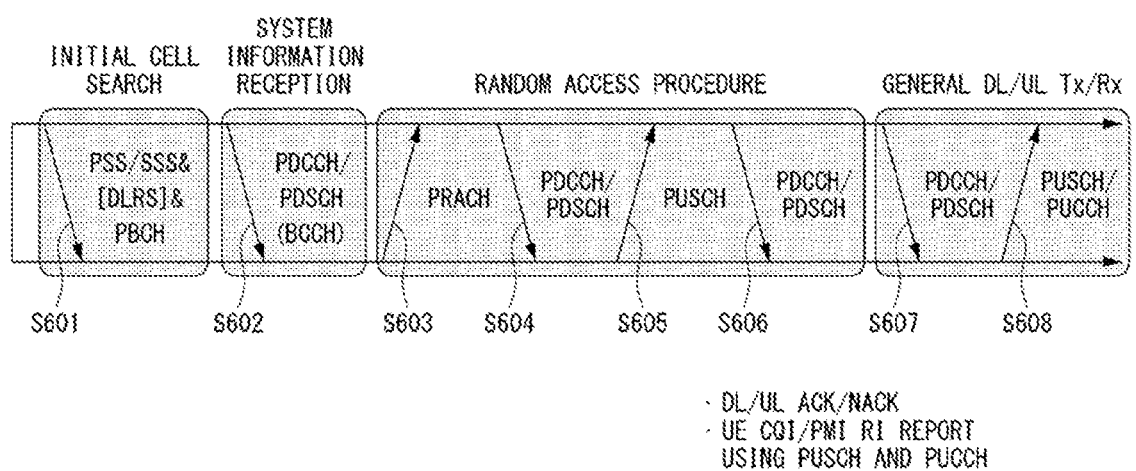

[FIG. 7]
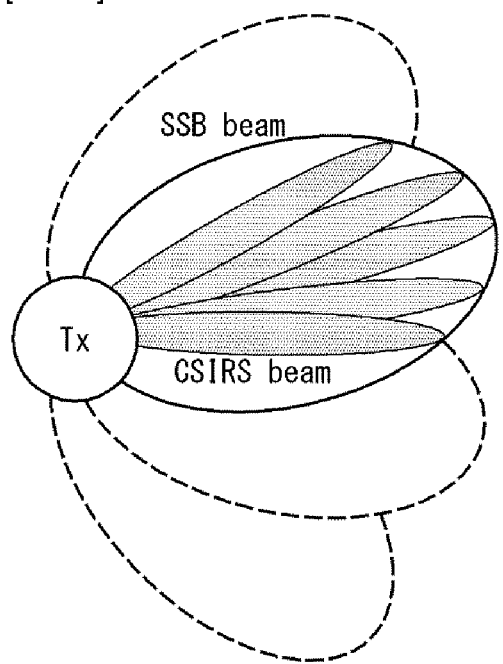

[FIG. 8]
Base station Rx beam sweeping	Base station beam being fixed
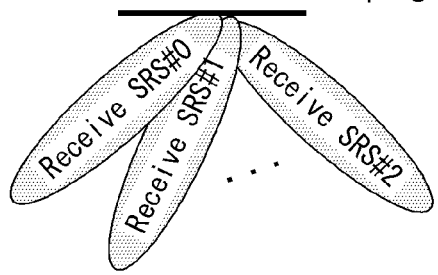 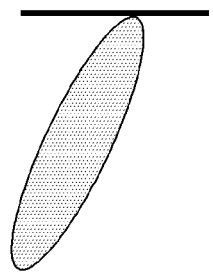
 
UE TX beam (being fixed)　　　　　　　UE Tx beam sweeping
(a)　　　　　　　　　　　　　　　(b)

[FIG. 9]
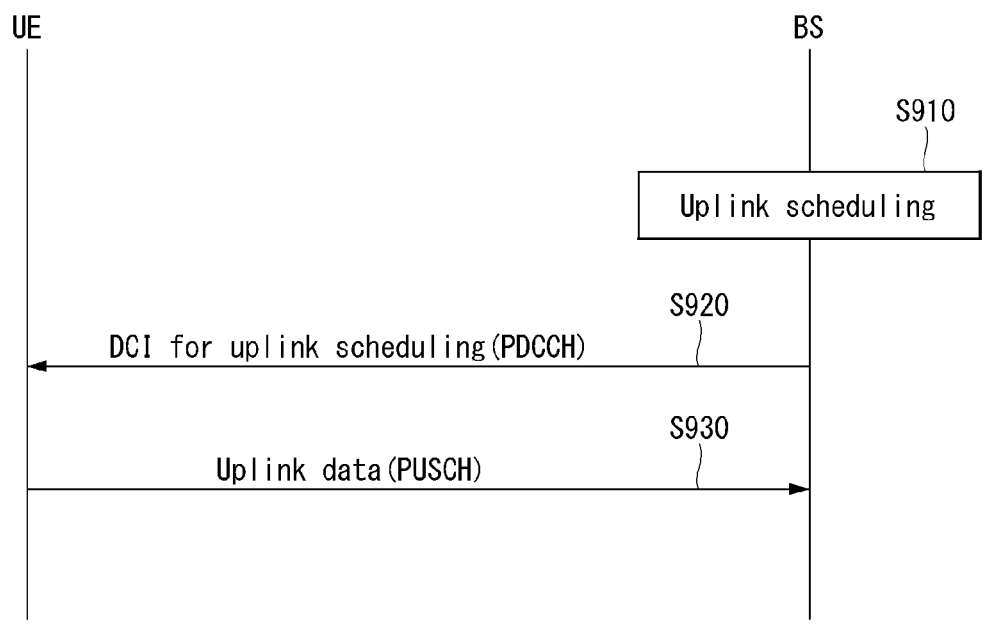

[FIG. 10]
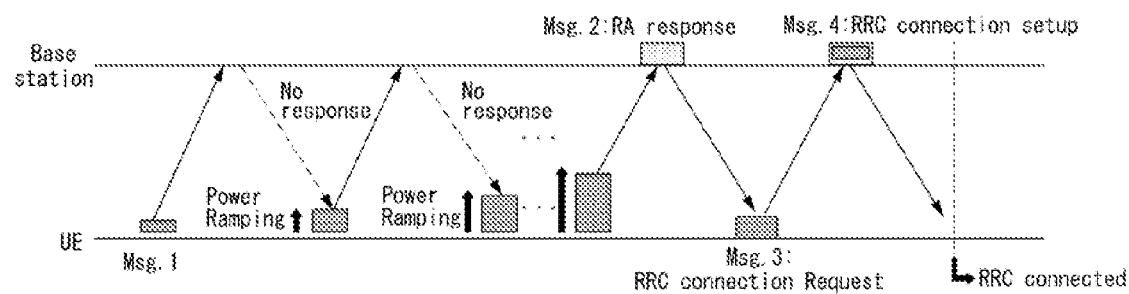

[FIG. 11]
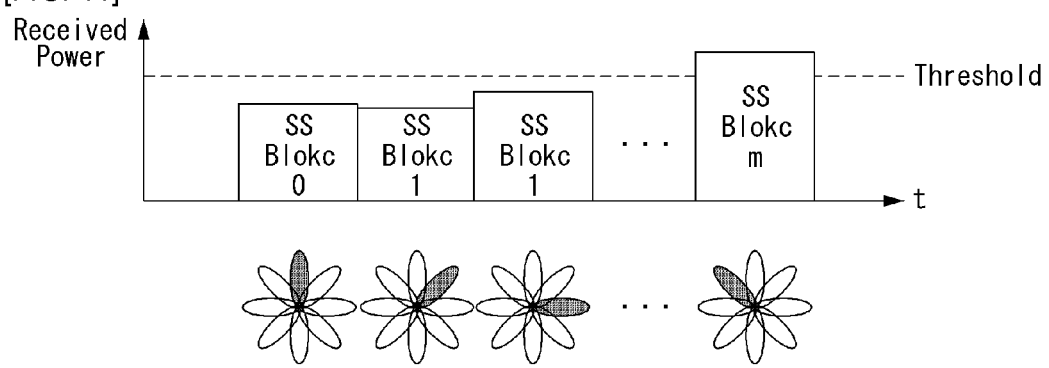

[FIG. 12]
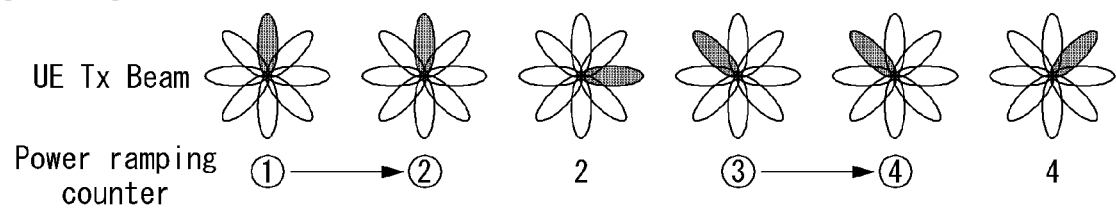

[FIG. 13]
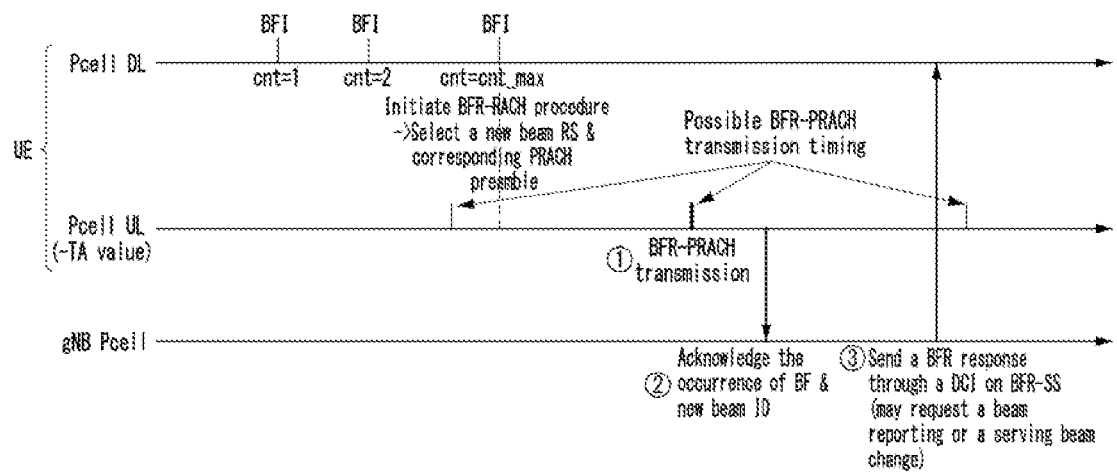

[FIG. 14]
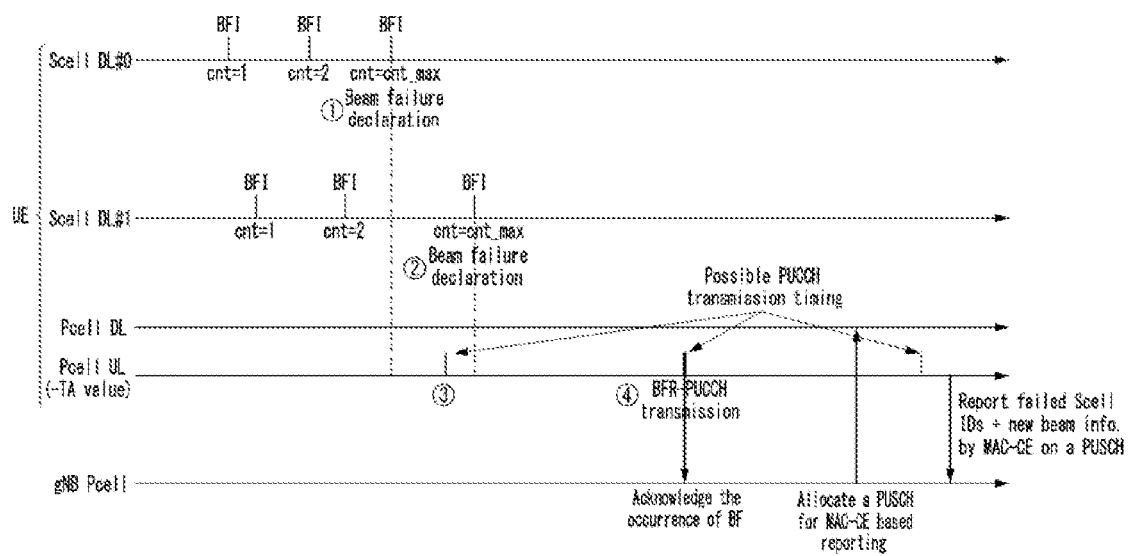

[FIG. 15]
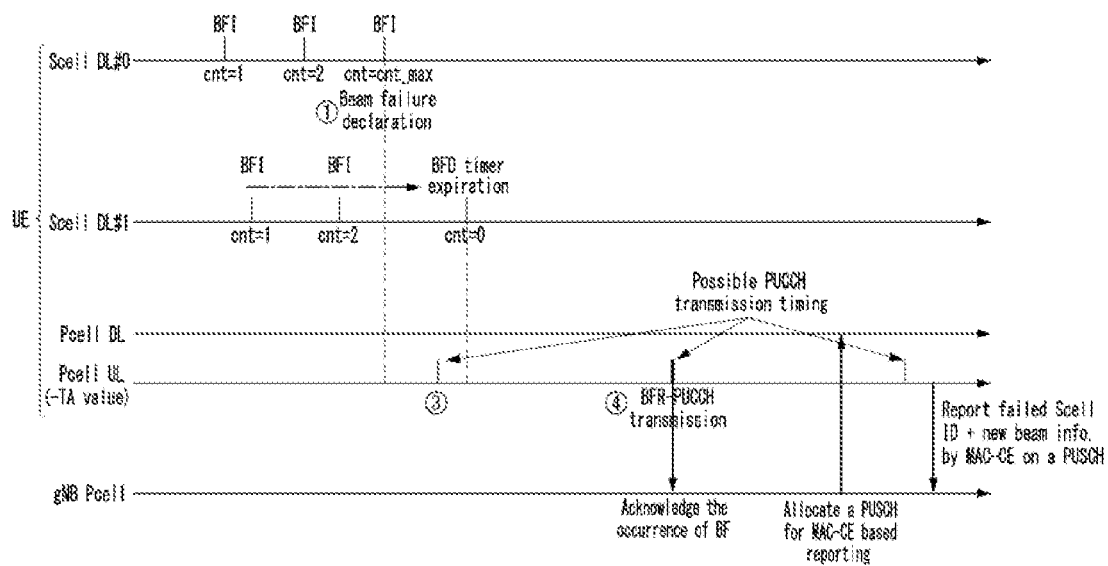

[FIG. 16]
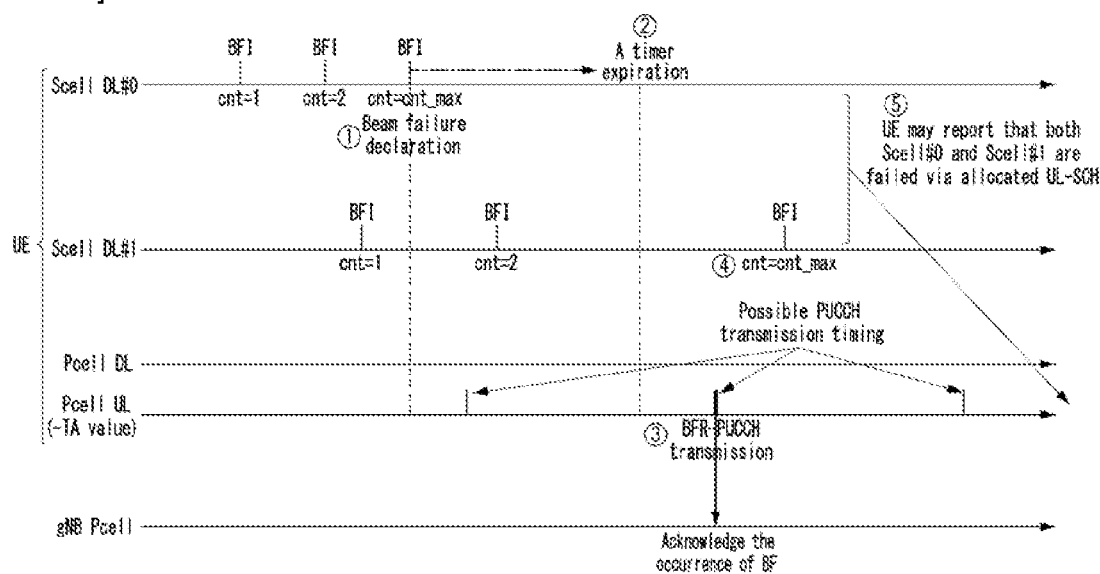

[FIG. 17]
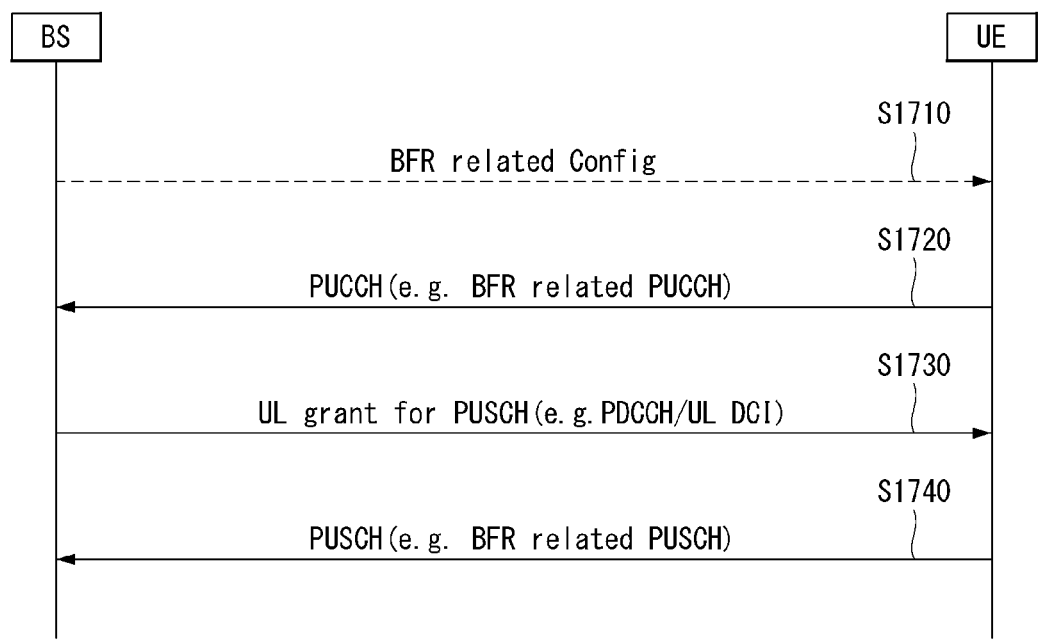

[FIG. 18]
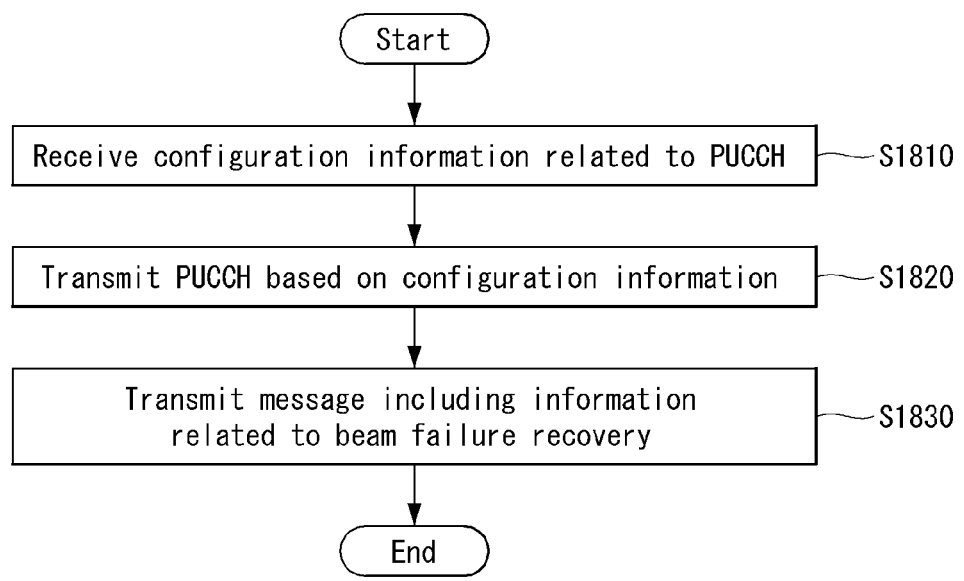

[FIG. 19]
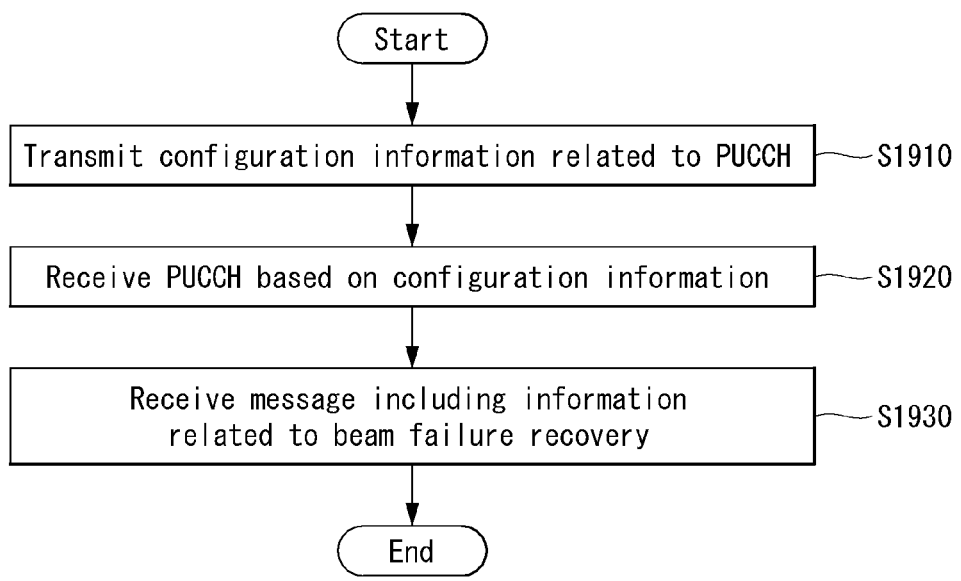

[FIG. 20]
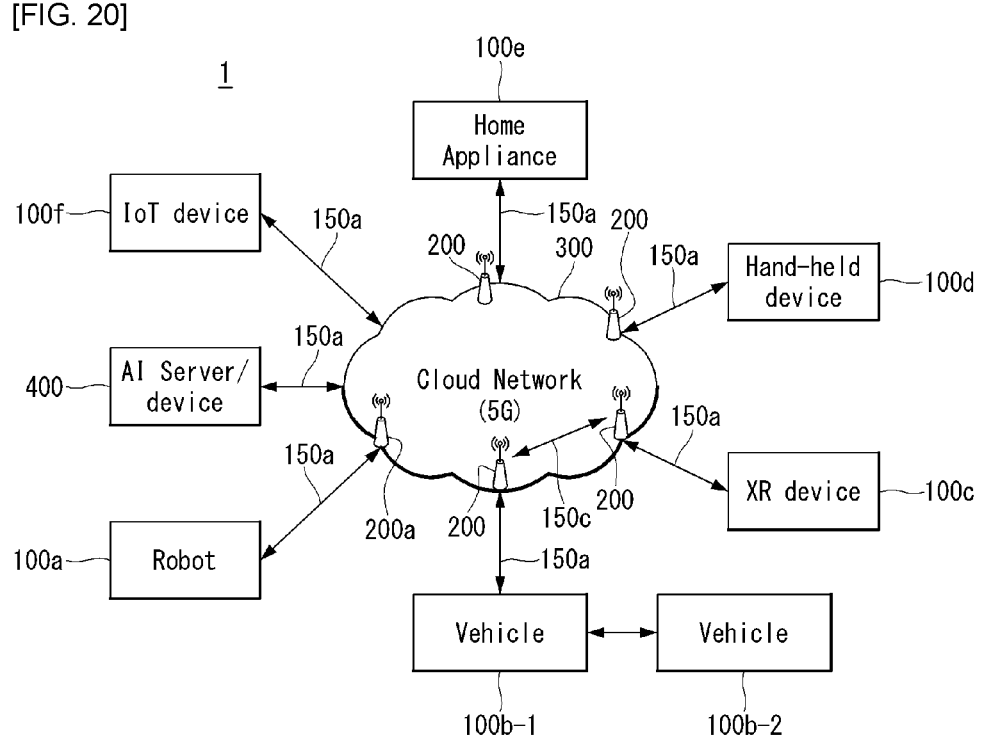

[FIG. 21]
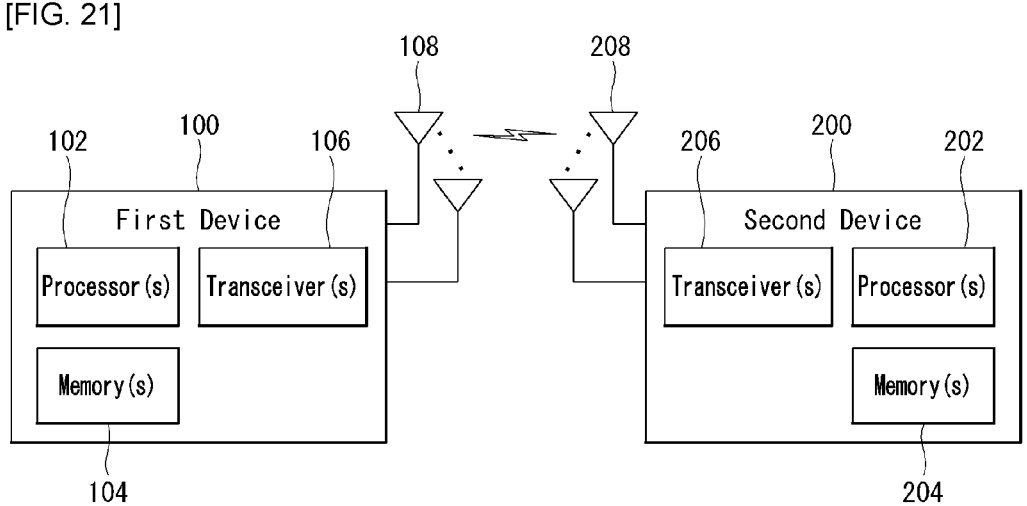

[FIG. 22]
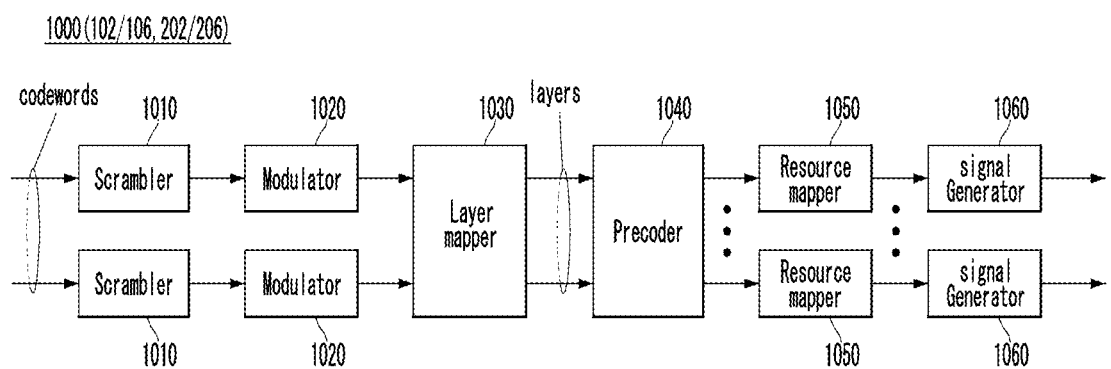

[FIG. 23]
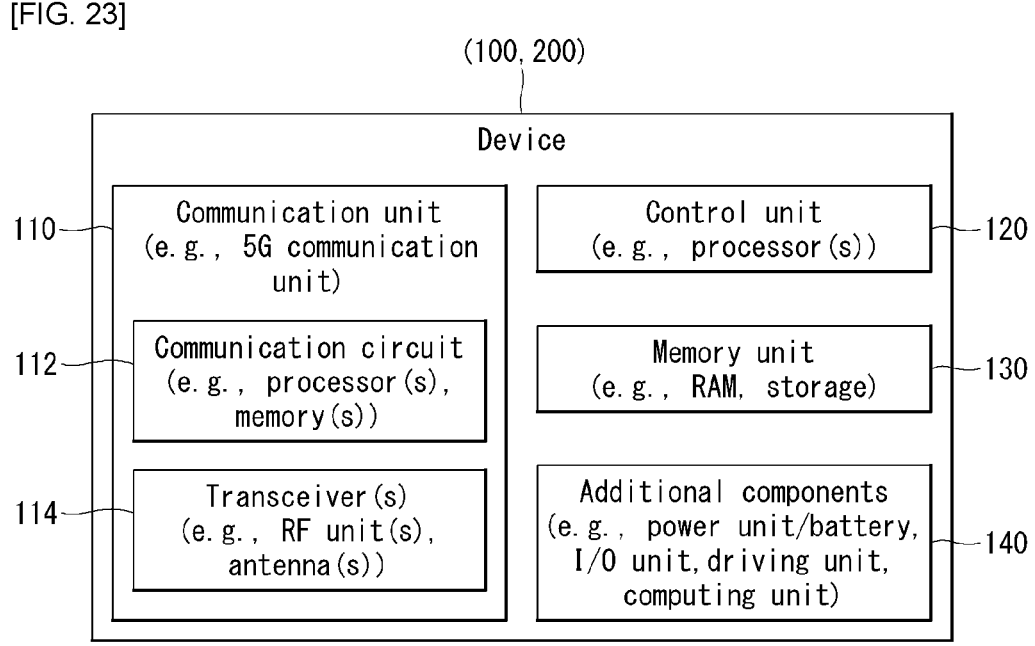

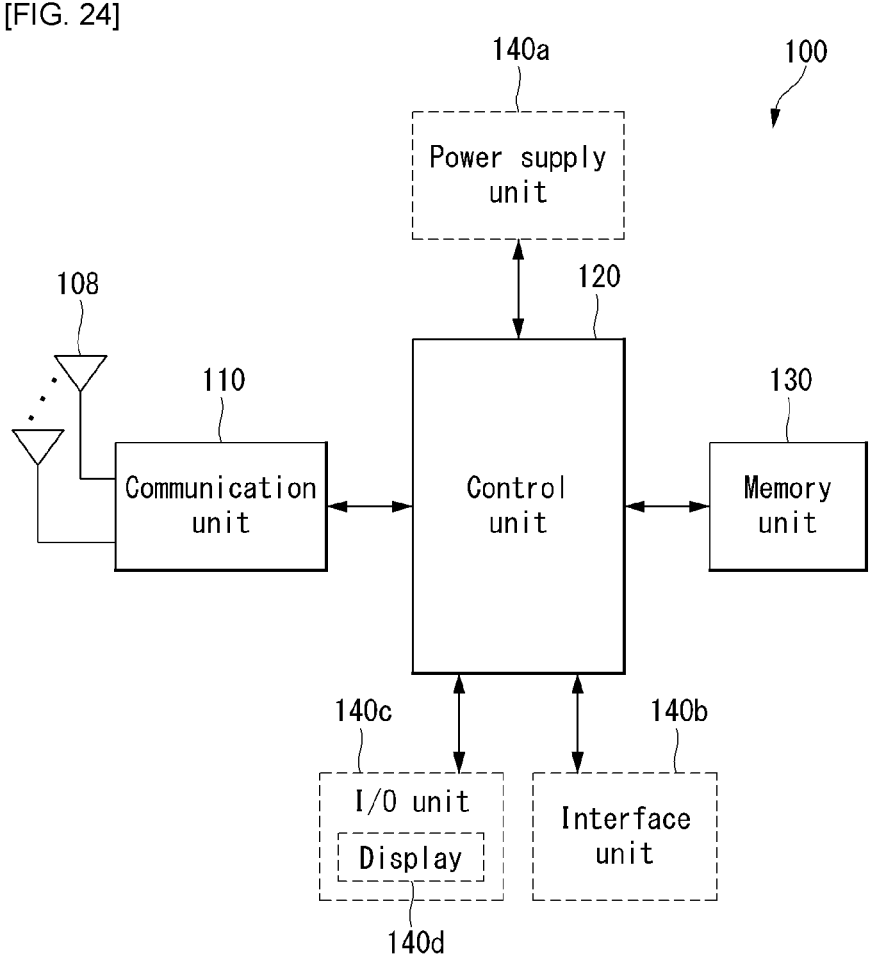
[FIG. 24]

METHOD FOR PERFORMING BEAM FAILURE RECOVERY PROCEDURE IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2020/008436, filed on Jun. 29, 2020, which claims the benefit of U.S. Provisional Application No. 62/867,932, filed on Jun. 28, 2019, the contents of which are all hereby incorporated by reference herein in their entireties.

TECHNICAL FIELD

The present disclosure relates to a method for performing a beam failure recovery procedure in a wireless communication system, and a device therefor.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure provides a method for performing a beam failure recovery procedure and a device therefor.

A PRACH based beam failure recovery (BFR) procedure to which carrier aggregation (CA) is applied is limitedly applied to a primary cell (PCell) or a primary-secondary cell (PSCell). The reason is that there may no UL carrier in a secondary cell (SCell) and a contention based PRACH may not be configured.

As a case where each of a report of occurrence of a beam failure and a subsequent report according to the beam failure is separately transmitted, in a case where a beam failure of the other serving cell occurs after occurrence of a beam failure of any one serving cell, the subsequent report according to the beam failure should be transmitted multiple times. In such a case, it is inefficient in terms of power utilization of a UE and a BS operation of receiving the subsequent report.

Accordingly, the present disclosure provides a method for performing a beam failure recovery procedure and a device therefor in order to solve the problems.

The technical objects of the present disclosure are not limited to the aforementioned technical objects, and other technical objects, which are not mentioned above, will be apparently appreciated by a person having ordinary skill in the art from the following description.

Technical Solution

A method for performing, by a UE, a beam failure recovery procedure in a wireless communication system according to an embodiment of the present disclosure includes: receiving configuration information related to a physical uplink control channel (PUCCH); transmitting the PUCCH based on the configuration information, the PUCCH being related to beam failure recovery (BFR) of at least one secondary cell (SCell); and transmitting a message including information related to the beam failure recovery (BFR).

The message including the information related to the beam failure recovery (BFR) is related to a beam failure detected before a specific time point.

The message may be based on a medium access control-control element (MAC-CE).

The specific time point may be related to a multiplexing and assembly operation related to the MAC-CE.

The MAC-CE may include information related to at least one of an ID of the at least one secondary cell (SCell), whether a new beam related to the beam failure exists, or an ID of a reference signal (RS) related to the new beam.

The beam failure detected before the specific time point may include a beam failure of the secondary cell detected after the PUCCH transmission.

The beam failure may be detected based on a count of a beam failure instance (BFI) being equal to larger than a beam failure instance Max count.

The beam failure instance Max count may be configured for each secondary cell (SCell).

The count of the beam failure instance (BFI) may be counted for each secondary cell (SCell).

The method may further include receiving an uplink (UL) grant related to the PUCCH. The message including the information related to the beam failure recovery (BFR) may be transmitted based on a physical uplink shared channel (PUSCH) scheduled by the UL grant.

A user equipment (UE) performing a beam failure recovery procedure in a wireless communication system according to another embodiment of the present disclosure includes: one or more transceivers; one or more processors controlling the one or more transceivers; and one or more memories operably connectable to the one or more processors, and storing instructions of performing operations when the beam failure recovery procedure is executed by the one or more processors.

The operations include receiving configuration information related to a physical uplink control channel (PUCCH), transmitting the PUCCH based on the configuration information, the PUCCH being related to beam failure recovery (BFR) of at least one secondary cell (SCell), and transmitting a message including information related to the beam failure recovery (BFR).

The message including the information related to the beam failure recovery (BFR) may be related to a beam failure detected before a specific time point.

The message may be based on a medium access control-control element (MAC-CE).

The specific time point may be related to a multiplexing and assembly operation related to the MAC-CE.

The MAC-CE may include information related to at least one of an ID of the at least one secondary cell (SCell), whether a new beam related to the beam failure exists, or an ID of a reference signal (RS) related to the new beam.

A device according to yet another embodiment of the present disclosure includes one or more memories and one or more processors functionally connected to the one or more memories.

The one or more processors are configured to control the device to receive configuration information related to a physical uplink control channel (PUCCH), transmit the PUCCH based on the configuration information, the PUCCH being related to beam failure recovery (BFR) of at least one secondary cell (SCell), and transmit a message including information related to the beam failure recovery (BFR).

The message including the information related to the beam failure recovery (BFR) is related to a beam failure detected before a specific time point.

One or more non-transitory computer-readable media according to still yet another embodiment of the present disclosure store one or more instructions.

One or more instructions executable by one or more processors is configured to control a UE to receive configuration information related to a physical uplink control channel (PUCCH), transmit the PUCCH based on the configuration information, the PUCCH being related to beam failure recovery (BFR) of at least one secondary cell (SCell), and transmit a message including information related to the beam failure recovery (BFR).

The message including the information related to the beam failure recovery (BFR) is related to a beam failure detected before a specific time point.

Advantageous Effects

According to an embodiment of the present disclosure, a beam failure recovery procedure is initiated based on a physical uplink control channel (PUCCH). Beam failure recovery can be performed based on the PUCCH, so the beam failure recovery (BFR) can be effectively supported even to a secondary cell (SCell). In particular, when a beam failure occurs in a secondary cell (SCell) for a high-frequency band (e.g., 30 GHz), the beam failure recovery can be more effectively performed.

According to an embodiment of the present disclosure, a message including information related to the beam failure recovery is transmitted. The message is related to a beam failure detected before a specific time point. Accordingly, after the beam failure is first detected, a subsequent report (i.e., the message) related to the beam failure is transmitted, which includes the information related to the beam failure detected before the specific time point, so power of a UE can be reduced and the beam failure recovery procedure can be improved in terms of signaling overhead.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8 illustrates an example of a UL BM procedure using an SRS.

FIG. 9 illustrates an uplink transmission/reception operation to which the method proposed in this disclosure may be applied.

FIG. 10 illustrates an example of a random access procedure.

FIG. 11 is a diagram for explaining the concept of a threshold value for an SS block for RACH resource association.

FIG. 12 is a diagram for explaining a ramping counter of a PRACH.

FIG. 13 is a diagram for describing a beam failure recovery related operation to which a method proposed in the present disclosure may be applied.

FIG. 14 is a diagram for describing an example of a time point of transmitting a beam failure recovery request according to an embodiment of the present disclosure.

FIG. 15 is a diagram for describing another example of the time point of transmitting the beam failure recovery request according to an embodiment of the present disclosure.

FIG. 16 is a diagram for describing yet another example of the time point of transmitting the beam failure recovery request according to an embodiment of the present disclosure.

FIG. 17 illustrates an example of a signaling between a UE and a BS to which a method proposed in the present disclosure may be applied.

FIG. 18 is a flowchart for describing a method of performing, by a UE, a beam failure recovery procedure in a wireless communication system according to an embodiment of the present disclosure.

FIG. 19 is a flowchart for describing a method of performing, by a BS, a beam failure recovery procedure in a wireless communication system according to another embodiment of the present disclosure.

FIG. 20 illustrates a communication system 1 applied to the present disclosure.

FIG. 21 illustrates wireless devices applicable to the present disclosure.

FIG. 22 illustrates a signal process circuit for a transmission signal.

FIG. 23 illustrates another example of a wireless device applied to the present disclosure.

FIG. 24 illustrates a hand-held device applied to the present disclosure.

MODE FOR INVENTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) a ULtra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate.

Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies may be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | Δf = $2^μ · 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$, and $N_f=4096$. Downlink and uplink transmissions is constituted of a radio frame with a period of $T_f=(\Delta f_{max} N_f/100) \cdot T_s=10$ ms. Here, the radio frame is constituted of 10 subframes each of which has a period of $T_{sf}=(\Delta f_{max} N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^μ \in \{0, \ldots, N_{subframe}^{slots, μ}-1\}$ in the subframe and in ascending order of $n_{s,f}^μ \in \{0, \ldots, N_{frame}^{slots,μ}-1\}$ in the radio frame. One slot includes consecutive OFDM symbols of $N_{symb}^μ$, and $N_{symb}^μ$ is determined according to the used numerology and slot configuration. In the subframe, the start of slot $n_s^μ$ is temporally aligned with the start of $n_s^μ N_{symb}^μ$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame, μ}$ of slots per radio frame, and the number $N_{slot}^{subframe, μ}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu}N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^{\mu}N_{sc}^{RB}$ subcarriers, and $2^{\mu}N_{symb}^{(\mu)}$ OFDM symbols, where $N_{RB}^{\mu} \leq N_{RB}^{max,\mu}$. $N_{RB}^{max, \mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k, l̄), where k=0, . . . , $N_{RB}^{\mu}N_{sc}^{RB}-1$ is an index on a frequency domain, and l̄=0, . . . , $2^{\mu}N_{symb}^{(\mu)}-1$ refers to a location of a symbol in a subframe. The index pair (k, l̄) is used to refer to a resource element in a slot, where l=0, . . . , $N_{symb}^{\mu}-1$.

The resource element (k, l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

-- ASN1START
-- TAG-TCI-STATE-START
TCI-State ::=           SEQUENCE {
   tci-StateId             TCI-StateId,
   qcl-Type1               QCL-Info,
   qcl-Type2               QCL-Info
   ...
}
QCL-Info ::=            SEQUENCE {
   cell                    ServCellIndex
   bwp-Id                  BWP-Id
   referenceSignal         CHOICE {
      csi-rs                   NZP-CSI-RS-ResourceId,
      ssb                      SSB-Index
   },
   qcl-Type                ENUMERATED {typeA, typeB, typeC, typeD},
   ...
}
-- TAG-TCI-STATE-STOP
-- ASN1STOP In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≤1 SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIG. 8 illustrates an example of a UL BM procedure using a SRS.

More specifically, (a) of FIG. 8 illustrates an Rx beam determination procedure of a base station, and (a) of FIG. 8 illustrates a Tx beam sweeping procedure of a UE.

FIG. 9 illustrates an uplink transmission/reception operation to which the method proposed in this disclosure may be applied.

Referring to FIG. 9, a BS schedules uplink transmission such as a frequency/time resource, a transport layer, an uplink precoder, and an MCS (S910). In particular, the BS may determine a beam for a UE to transmit a PUSCH.

The UE receives a DCI for uplink scheduling (i.e., including scheduling information of the PUSCH) on a PDCCH from the BS (S920).

For uplink scheduling, DCI format 0_0 or 0_1 may be used. In particular, DCI format 0_1 includes the following information.

DCI format identifier (identifier for DCI formats), UL/SUL (supplementary uplink) indicator (UL/SUL indicator), bandwidth part indicator, frequency domain resource assignment, time domain resource assignment, frequency hopping flag, modulation and coding scheme (MCS), SRS resource indicator (SRI), precoding information and number of layers, antenna port(s), SRS request, DMRS sequence initialization, uplink shared channel (UL-SCH) indicator.

In particular, SRS resources configured in the SRS resource set associated with the higher layer parameter 'usage' may be indicated by an SRS resource indicator field. In addition, 'spatialRelationInfo' may be set for each SRS resource, and the value may be one of {CRI, SSB, SRI}.

The UE transmits uplink data to the BS on PUSCH (S930).

When the UE detects a PDCCH including DCI format 0_0 or 0_1, it transmits a corresponding PUSCH according to an indication by the corresponding DCI.

For PUSCH transmission, two transmission schemes are supported: codebook-based transmission and non-codebook-based transmission.

i) When the higher layer parameter 'txConfig' is set to 'codebook', the UE is set to codebook-based transmission. Meanwhile, when the higher layer parameter 'txConfig' is set to 'nonCodebook', the UE is set to non-codebook-based transmission. If the higher layer parameter 'txConfig' is not set, the UE does not expect to be scheduled by DCI format 0_1. When the PUSCH is scheduled by DCI format 0_0, PUSCH transmission is based on a single antenna port.

In the case of codebook-based transmission, the PUSCH may be scheduled by DCI format 0_0, DCI format 0_1 or semi-statically. When the PUSCH is scheduled by DCI format 0_1, the UE determines a PUSCH transmission precoder based on SRI, TPMI (Transmit Precoding Matrix Indicator) and transmission rank from DCI, as given by the SRS resource indicator field and the precoding information and number of layers field. The TPMI is used to indicate a precoder to be applied across an antenna port, and corresponds to an SRS resource selected by the SRI when multiple SRS resources are configured. Alternatively, when a single SRS resource is configured, the TPMI is used to indicate a precoder to be applied across the antenna port and corresponds to the single SRS resource. A transmission precoder is selected from the uplink codebook having the same number of antenna ports as the higher layer parameter 'nrofSRS-Ports'.

When the higher layer parameter 'txConfig' set to 'codebook' in the UE is configured, at least one SRS resource is configured in the UE. The SRI indicated in slot n is associated with the latest transmission of the SRS resource identified by the SRI, and here, the SRS resource precedes a PDCCH carrying the SRI (i.e., slot n).

ii) In the case of non-codebook-based transmission, the PUSCH may be scheduled by DCI format 0_0, DCI format 0_1 or semi-statically. When multiple SRS resources are configured, the UE may determine the PUSCH precoder and transmission rank based on the wideband SRI, and here, the SRI is given by the SRS resource indicator in the DCI or by the higher layer parameter 'srs-ResourceIndicator'. The UE uses one or multiple SRS resources for SRS transmission, and here, the number of SRS resources may be configured for simultaneous transmission within the same RB based on UE capability. Only one SRS port is configured for each SRS resource. Only one SRS resource may be set as the higher layer parameter 'usage' set to 'nonCodebook'. The maximum number of SRS resources that may be configured for non-codebook-based uplink transmission is 4. The SRI indicated in slot n is associated with the latest transmission of the SRS resource identified by the SRI, and here, the SRS transmission precedes the PDCCH carrying the SRI (i.e., slot n).

Random Access Related Procedure

The random access procedure of the UE can be summarized in Table 6 and FIG. 10.

TABLE 6

| | Type of Signals | Operations/Information Acquired |
|---|---|---|
| 1$^{st}$ step | PRACH preamble in UL | Initial beam acquisition Random election of RA-preamble ID |
| 2$^{nd}$ Step | Random Access Response on DL-SCH | Timing alignment information RA-preamble ID Initial UL grant, Temporary C-RNTI |
| 3$^{rd}$ Step | UL transmission on UL-SCH | RRC connection request UE identifier |
| 4$^{th}$ Step | Contention Resolution on DL | Temporary C-RNTI on PDCCH for initial access C-RNTI on PDCCH for UE in RRC_CONNECTED |

FIG. 10 illustrates an example of a random access procedure.

Firstly, the UE may transmit PRACH preamble in UL as Msg1 of the random access procedure.

Random access preamble sequences, of two different lengths are supported. Long sequence length 839 is applied with subcarrier spacings of 1.25 and 5 kHz and short sequence length 139 is applied with sub-carrier spacings 15, 30, 60 and 120 kHz. Long sequences support unrestricted sets and restricted sets of Type A and Type B, while short sequences support unrestricted sets only.

Multiple RACH preamble formats are defined with one or more RACH OFDM symbols, and different cyclic prefix and guard time. The PRACH preamble configuration to use is provided to the UE in the system information.

When there is no response to the Msg1, the UE may retransmit the PRACH preamble with power ramping within the prescribed number of times. The UE calculates the PRACH transmit power for the retransmission of the preamble based on the most recent estimate pathloss and power ramping counter. If the UE conducts beam switching, the counter of power ramping remains unchanged.

The system information informs the UE of the association between the SS blocks and the RACH resources.

FIG. 11 is a diagram for explaining the concept of a threshold value for an SS block for RACH resource association.

The threshold of the SS block for RACH resource association is based on the RSRP and network configurable. Transmission or retransmission of RACH preamble is based on the SS blocks that satisfy the threshold.

When the UE receives random access response on DL-SCH, the DL-SCH may provide timing alignment information, RA-preamble ID, initial UL grant and Temporary C-RNTI.

Based on this information, the UE may transmit UL transmission on UL-SCH as Msg3 of the random access procedure. Msg3 can include RRC connection request and UE identifier.

In response, the network may transmit Msg4, which can be treated as contention resolution message on DL. By receiving this, the UE may enter into RRC connected state.

Specific explanation for each of the steps is as follows:

Prior to initiation of the physical random access procedure, Layer 1 shall receive from higher layers a set of SS/PBCH block indexes and shall provide to higher layers a corresponding set of RSRP measurements.

Prior to initiation of the physical random access procedure, Layer 1 shall receive the following information from the higher layers:

Configuration of physical random access channel (PRACH) transmission parameters (PRACH preamble format, time resources, and frequency resources for PRACH transmission).

Parameters for determining the root sequences and their cyclic shifts in the PRACH preamble sequence set (index to logical root sequence table, cyclic shift ($N_{cs}$) and set type (unrestricted, restricted set A, or restricted set B)).

From the physical layer perspective, the L1 random access procedure encompasses the transmission of random access preamble (Msg1) in a PRACH, random access response (RAR) message with a PDCCH/PDSCH (Msg2), and when applicable, the transmission of Msg3 PUSCH, and PDSCH for contention resolution.

If a random access procedure is initiated by a "PDCCH order" to the UE, a random access preamble transmission is with a same subcarrier spacing as a random access preamble transmission initiated by higher layers.

If a UE is configured with two UL carriers for a serving cell and the UE detects a "PDCCH order", the UE uses the UL/SUL indicator field value from the detected "PDCCH order" to determine the UL carrier for the corresponding random access preamble transmission.

Regarding the random access preamble transmission step, physical random access procedure is triggered upon request of a PRACH transmission by higher layers or by a PDCCH order. A configuration by higher layers for a PRACH transmission includes the following:

A configuration for PRACH transmission.

A preamble index, a preamble subcarrier spacing, $P_{PRACHtarget}$, a corresponding RA-RNTI, and a PRACH resource.

A preamble is transmitted using the selected PRACH format with transmission power $P_{PRACH,b,f,c}(i)$, on the indicated PRACH resource.

A UE is provided a number of SS/PBCH blocks associated with one PRACH occasion by the value of higher layer parameter SSB-perRACH-Occasion. If the value of SSB-perRACH-Occasion is smaller than one, one SS/PBCH block is mapped to 1/SSB-per-rach-occasion consecutive PRACH occasions. The UE is provided a number of preambles per SS/PBCH block by the value of higher layer parameter cb-preamblePerSSB and the UE determines a total number of preambles per SSB per PRACH occasion as the multiple of the value of SSB-perRACH-Occasion and the value of cb-preamblePerSSB.

SS/PBCH block indexes are mapped to PRACH occasions in the following order.

First, in increasing order of preamble indexes within a single PRACH occasion.

Second, in increasing order of frequency resource indexes for frequency multiplexed PRACH occasions.

Third, in increasing order of time resource indexes for time multiplexed PRACH occasions within a PRACH slot.

Fourth, in increasing order of indexes for PRACH slots.

The period, starting from frame 0, for the mapping of SS/PBCH blocks to PRACH occasions is the smallest of $\{1, 2, 4\}$ PRACH configuration periods that is larger than or equal to $\lceil N_{Tx}^{SSB}/N_{PRACHperiod}^{SSB} \rceil$, where the UE obtains $N_{Tx}^{SSB}$ from higher layer parameter SSB-transmitted-SIB1 and $N_{PRACHperiod}^{SSB}$ is the number of SS/PBCH blocks that can be mapped to one PRACH configuration period.

If a random access procedure is initiated by a PDCCH order, the UE shall, if requested by higher layers, transmit a PRACH in the first available PRACH occasion for which a time between the last symbol of the PDCCH order reception and the first symbol of the PRACH transmission is larger than or equal to $N_{t,2}+\Delta_{BWPSwitching}+\Delta_{Delay}$ msec where $N_{T,2}$ is a time duration of $N_2$ symbols corresponding to a PUSCH preparation time for PUSCH processing capability 1, $\Delta_{BWPSwitching}$ is pre-defined, and $\Delta_{Delay}>0$.

In response to a PRACH transmission, a UE attempts to detect a PDCCH with a corresponding RA-RNTI during a window controlled by higher layers. The window starts at the first symbol of the earliest control resource set the UE is configured for Type1-PDCCH common search space that is at least $\lceil (\Delta \cdot N_{slot}^{subframe,\mu} \cdot N_{symb}^{slot})/T_{sf} \rceil$ symbols after the last symbol of the preamble sequence transmission. The length of the window in number of slots, based on the subcarrier spacing for Type0-PDCCH common search space is provided by higher layer parameter rar-WindowLength.

If a UE detects the PDCCH with the corresponding RA-RNTI and a corresponding PDSCH that includes a DL-SCH transport block within the window, the UE passes the transport block to higher layers. The higher layers parse the transport block for a random access preamble identity (RAPID) associated with the PRACH transmission. If the higher layers identify the RAPID in RAR message(s) of the DL-SCH transport block, the higher layers indicate an uplink grant to the physical layer. This is referred to as random access response (RAR) UL grant in the physical layer. If the higher layers do not identify the RAPID associated with the PRACH transmission, the higher layers can indicate to the physical layer to transmit a PRACH. A minimum time between the last symbol of the PDSCH reception and the first symbol of the PRACH transmission is equal to $N_{T,1}+\Delta_{new}+0.5$ msec where $N_{T,1}$ is a time duration of $N_1$ symbols corresponding to a PDSCH reception time for PDSCH processing capability 1 when additional PDSCH DM-RS is configured and $\lambda_{new} \geq 0$.

A UE shall receive the PDCCH with the corresponding RA-RNTI and the corresponding PDSCH that includes the DL-SCH transport block with the same DM-RS antenna port quasi co-location properties, as for a detected SS/PBCH block or a received CSI-RS. If the UE attempts to detect the PDCCH with the corresponding RA-RNTI in response to a PRACH transmission initiated by a PDCCH order, the UE assumes that the PDCCH and the PDCCH order have same DM-RS antenna port quasi co-location properties.

A RAR UL grant schedules a PUSCH transmission from the UE (Msg3 PUSCH). The contents of the RAR UL grant, starting with the MSB and ending with the LSB, are given in Table 7. Table 7 shows random access response grant content field size.

TABLE 7

| RAR grant field | Number of bits |
|---|---|
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI request | 1 |
| Reserved bits | 3 |

The Msg3 PUSCH frequency resource allocation is for uplink resource allocation type 1. In case of frequency hopping, based on the indication of the frequency hopping flag field, the first one or two bits, $N_{UL,hop}$ bits, of the Msg3 PUSCH frequency resource allocation field are used as hopping information bits as described in following [Table I.5].

The MCS is determined from the first sixteen indices of the applicable MCS index table for PUSCH.

The TPC command $\delta_{msg2,b,f,c}$ is used for setting the power of the Msg3 PUSCH, and is interpreted according to Table 8. Table 8 shows TPC command $\delta_{msg2,b,f,c}$ for Msg3 PUSCH.

TABLE 8

| TPC command | Value(in dB) |
|---|---|
| 0 | −6 |
| 1 | −4 |
| 2 | −2 |
| 3 | 0 |
| 4 | 2 |
| 5 | 4 |
| 6 | 6 |
| 7 | 8 |

In non-contention based random access procedure, the CSI request field is interpreted to determine whether an aperiodic CSI report is included in the corresponding PUSCH transmission. In contention based random access procedure, the CSI request field is reserved.

Unless a UE is configured a subcarrier spacing, the UE receives subsequent PDSCH using same subcarrier spacing as for the PDSCH reception providing the RAR message.

If a UE does not detect the PDCCH with a corresponding RA-RNTI and a corresponding DL-SCH transport block within the window, the UE performs the procedure for random access response reception failure.

For example, the UE may perform power ramping for retransmission of the Random Access Preamble based on a power ramping counter. However, the power ramping counter remains unchanged if a UE conducts beam switching in the PRACH retransmissions as shown in FIG. 12.

FIG. 12 is a diagram for explaining a ramping counter of a PRACH.

In FIG. 12, the UE may increase the power ramping counter by 1, when the UE retransmit the random access preamble for the same beam. However, when the beam had been changed, the power ramping counter remains unchanged.

Regarding Msg3 PUSCH transmission, higher layer parameter msg3-tp indicates to a UE whether or not the UE shall apply transform precoding, for an Msg3 PUSCH transmission. If the UE applies transform precoding to an Msg3 PUSCH transmission with frequency hopping, the frequency offset for the second hop is given in Table9. Table 9 shows frequency offset for second hop for Msg3 PUSCH transmission with frequency hopping.

TABLE 9

| Number of PRBs in initial active UL BWP | Value of $N_{UL, hop}$ Hopping Bits | Frequency offset for $2^{nd}$ hop |
|---|---|---|
| $N_{BWP}^{size} < 50$ | 0 | $N_{BWP}^{size}/2$ |
|  | 1 | $N_{BWP}^{size}/4$ |
| $N_{BWP}^{size} \geq 50$ | 00 | $N_{BWP}^{size}/2$ |
|  | 01 | $N_{BWP}^{size}/4$ |
|  | 10 | $-N_{BWP}^{size}/4$ |
|  | 11 | reserved |

The subcarrier spacing for Msg3 PUSCH transmission is provided by higher layer parameter msg3-scs. A UE shall transmit PRACH and Msg3 PUSCH on a same uplink carrier of the same serving cell. An UL BWP for Msg3 PUSCH transmission is indicated by SystemInformationBlockType1.

A minimum time between the last symbol of a PDSCH reception conveying a RAR and the first symbol of a corresponding Msg3 PUSCH transmission scheduled by the RAR in the PDSCH for a UE when the PDSCH and the PUSCH have a same subcarrier spacing is equal to $N_{T,1} + N_{T,2} + N_{TA,max} + 0.5$ msec. $N_{T,1}$ is a time duration of $N_1$ symbols corresponding to a PDSCH reception time for PDSCH processing capability 1 when additional PDSCH DM-RS is configured, $N_{T,2}$ is a time duration of $N_2$ symbols corresponding to a PUSCH preparation time for PUSCH processing capability 1, and $N_{TA,max}$ is the maximum timing adjustment value that can be provided by the TA command field in the RAR.

In response to an Msg3 PUSCH transmission when a UE has not been provided with a C-RNTI, the UE attempts to detect a PDCCH with a corresponding TC-RNTI scheduling a PDSCH that includes a UE contention resolution identity. In response to the PDSCH reception with the UE contention resolution identity, the UE transmits HARQ-ACK information in a PUCCH. A minimum time between the last symbol of the PDSCH reception and the first symbol of the corresponding HARQ-ACK transmission is equal to $N_{T,1} + 0.5$ msec. $N_{T,1}$ is a time duration of $N_1$ symbols corresponding to a PDSCH reception time for PDSCH processing capability 1 when additional PDSCH DM-RS is configured.

Beam Failure Recovery (BFR)

A beam mismatch problem may occur according to a period of beam management set in performing the DL/UL beam management process. In particular, when a wireless channel environment is changed due to location movement of the UE, rotation of the UE, and/or movement of surrounding objects (for example, a LoS environment is changed to a Non-LoS environment due to beam blocking), a best DL/UL beam pair may be changed, and with respect to such a change, when tracking is unsuccessful by a beam management process performed by a network indication, it may be determined that the beam failure event occurs. The UE may determine whether the beam failure event occurs through a reception quality of a downlink RS and a reporting message for such a situation or a message (hereinafter, referred to as a 'beam failure recovery request (BFRQ) message') for a beam recovery request should be delivered from the UE. The BS that receives the message may perform beam recovery through various processes including beam RS transmission, a beam reporting request, and the like for the beam recovery. Such a series of beam recovery process is referred to as beam failure recovery (BFR). In Rel-15 NR, a beam failure recovery (BFR) process for PCell or PScell (both cells are combined and also are referred to as a special cell (SpCell) in which a contention based PRACH resource continuously exists is standardized, and the corresponding procedure as an operation in a serving cell is constituted by a beam failure detection (BFD) process of the UE, a BFRQ process, and a process in which the UE monitors a response of the BS to BFRQ as follows (see 3GPP TS38.213, TS38.321, and TS38.331).

Beam Failure Detection (BFD)

When all PDCCH beams are falls to a determined quality value (Q_out) or less, it is determined that one beam failure instance occurs (here, the quality is based on hypothetical block error rate (BLER), i.e., when it is assumed that control information is transmitted to the corresponding PDCCH, a probability that demodulation of the corresponding information will be unsuccessful).

Here all PDCCH beams mean that a case where one or more a plurality of search spaces to monitor the PDCCH may be configured in the UE, and the beam may be configured differently for each search space, and in this case, all beams falls below a BLER threshold. As a criterion for judging the BFD RS by the UE, two following schemes are supported.

[implicit configuration of BFD RSs] A control resource set (CORESET [see TS38.213, TS38.214, and TS38.331]) ID which is a resource region in which the PDCCH may be transmitted may be configured in each search space, and RS information (e.g., CSI-RS resource ID, SSB ID) which is subjected to QCL in terms of a spatial RX parameter may be indicated/configured for each CORESET ID (in an NR standard, the QCLed RS is indicated/configured through transmit configuration information (TCI) indication). Here, the QCLed RS in terms of the spatial RX parameter means a method in which the BS announces that the UE should use (or may use) a beam used for corresponding spatially QCLed RS reception as it is in receiving the corresponding PDCCH DMRS. Consequently, in terms of the BS, the QCLed RS is a method that announces, to the UE, transmitting the PDCCH DMRS by applying the same transmission beam or a similar transmission beam (e.g., a case where a beam direction is the same/similar and a beam width is different) between spatially QCLed antenna ports).

[explicit configuration of BFD RSs] The BS may explicitly configure a beam RS(s) for the usage (beam failure detection), and in this case, the corresponding beam RS(s) corresponds to the 'all PDCCH beams'.

Each time an event occurs in which the hypothetical BLER measured based on the BFD RS(s) in a UE physical layer deteriorates to a specific threshold or more, it is announced to an MAC sub layer that the 'beam failure instance (BFI)' occurs, and when the BFI occurs as large as a predetermined count (beamFailureInstanceMaxCount) within a predetermined time (BFD timer), the MAC sub layer determines that the beam failure occurs, and initiates a related RACH operation.

Hereinafter, an MAC layer operation related to the BFD will be described.

The MAC entity:
1> when a beam failure instance indication is received in lower layers:
2> starts or starts again beamFailureDetectionTimer
2> increases BFI_COUNTER by 1
2> when BFI_COUNTER>=beam FailureInstanceMaxCount:
3> initiates a random access procedure in SpCell
1> when beamFailureDetectionTimer expires; or
1> when beam FailureDetectionTimer, beamFailureInstanceMaxCount or any of the reference signals used for beam failure detection is reconfigured by a higher layer:
2> configures BFI_COUNTER to 0
1> when the random access procedure is successfully completed:
2> configures BFI_COUNTER to 0
2> stops (configured) beamFailureRecoveryTimer
2> regards that the beam failure recovery procedure is successfully completed
BFRQ (based on PRACH): New beam identification+ PRACH transmission When BFIs of a predetermined number or more occur as described above, the UE may determine that the beam failure occurs, and perform the beam failure recovery operation. As an example of the beam failure recovery operation, a beam failure recovery request (BFRQ) operation based on an RACH procedure (i.e., PRACH) may be performed. Hereinafter, the corresponding BFRQ procedure will be described in detail.

The BS may configure, to the UE, an RS list (candidate-BeamRSList) corresponding to candidate beams which may be replaced upon occurrence of the BF through RRC, and dedicated PRACH resources may be configured for the corresponding candidate beams. Here, the dedicated PRACH resources are characteristics to be non-contention based PRACH (will also be referred to as contention free PRACH) resources, and when the beam may not be found in the corresponding list, the beam is selected among predetermined SSB resources to transmit the contention based PRACH. A specific procedure is as follows.

Step 1) The UE finds a beam having a predetermined quality value (Q_in) or more among RSs configured as a candidate beam RS set by the B.

When one beam RS exceeds a threshold, the corresponding beam RS is selected

When a plurality of beam RSs exceeds a threshold, one random beam RS is selected among the corresponding beam RSs When there is no beam which exceeds the threshold, Step 2 is performed Note1: Here, a beam quality is based on RSRP
Note2: There are three cases for the RS beam set configured by the BS 1) All beam RSs in the RS beam set are constituted by SSBs
2) All beam RSs in the RS beam set are constituted by CSI-RS resources
3) All beam RSs in the RS beam set are constituted by the SSBs and the CSI-RS resources Step 2) The UE finds a beam having a predetermined quality value (Q_in) or more among SSBs (connected to the contention based PRACH resource)

When one SSB exceeds a threshold, the corresponding beam RS is selected

When a plurality of SSBs exceeds a threshold, one random beam RS is selected among the corresponding beam RSs When there is no beam which exceeds the threshold, Step 3 is performed Step 3) The UE selects a random SSB among the SSBs (connected to the contention based PRACH resource)

The UE transmits, to the BS, a PRACH resource and preamble directly or indirectly connected and configured to the beam RS (CSI-RS or SSB) selected in such a process.

Here, the direct connection configuration is used in following case 1) or 2).

1) Case where a contention-free PRACH resource and preamble is configured for a specific RS within a candidate beam RS set separately configured for the BFR usage
2) Case where (contention based) PRACH resources and preambles mapped to SSBs universally for the other usage such as a random access, etc., are configured Here, the indirect connection configuration is used in the following case.

Case where the contention-free PRACH resource and preamble is not configured for the specific RS within the candidate beam RS set separately configured for the BFR usage In this case, the UE selects a (contention-free) PRACH resource and preamble connected to an SSB designated to be received with the same receive beam as the corresponding CSI-RS (i.e., quasi-co-located (QCLed) with respect to spatial Rx parameter).

Monitoring of gNB's response to the BFRQ

The UE monitors a response of the BS (gNB) to the corresponding PRACH transmission.

Here, the response to the contention-free PRACH resource & preamble is transmitted to a PDCCH masked with a C-RNTI, and this is received in a search space RRC-configured separately fro the BFR.

The search space is configured in a specific CORESET (for the BFR).

In a response to the contention PRACH, CORESET (e.g., CORESET 0 or CORESET 1) and a search space configured fora general contention PRACH based random access process are reused as they are.

When there is no response for a predetermined time, a new beam identification & selection process and a BFRQ & monitoring gNB's response process are repeated.

The processes may be performed until a predetermined maximum number of times of the PRACH transmission is reached or a configured timer (BFR timer) expired.

When the timer expired, the UE stops the contention free PRACH transmission, but contention based PRACH transmissions by SSB selection may be performed until N_max is reached.

FIG. 13 is a diagram for describing a beam failure recovery related operation to which a method proposed in the present disclosure may be applied. Specifically, FIG. 13 illustrates a beam failure recovery operation in a primary cell (PCell).

Scheduling Request

A scheduling request (SR) is used for requesting a UL-SCH resource for new transmission.

0, 1, or one or more SR configurations may be configured in the MAC entity. The SR configuration is constituted by a series of PUCCH resources for the SR in different BWPs and cells. In the case of a logical channel, up to one PUCCH resource is configured for the SR per BWP.

Each SR configuration corresponds to one or more logical channels. Each logical channel may be mapped to 0 or one SR configuration configured by the RRC. The SR configured (when such a configuration exists) of the logical channel for triggering the BSR is regarded as the corresponding SR configuration for the triggered SR.

The RRC configures the following parameters for a scheduling request procedure.

SR-ProhibitTimer (per SR configuration)
sr-TransMax (per SR configuration).

In the scheduling request procedure, the following UE variable is used.

SR_COUNTER (per SR configuration).

When the SR is triggered and other SRs pending, which correspond to the same SR configuration do not exist, the MAC entity should configure SR_COUNTER of the corresponding SR configuration to 0.

When the SR is triggered, it is regarded that the SR is pending until the SR triggering is cancelled. All pending SR(s) triggered before an MAC PDU assembly should be cancelled, and when and an MAC PDU is transmitted, each sr-ProhibitTimer should be stopped. The PDU includes a long or short BSR MAC CE including a buffer status up to a last event triggered before the MAC PDU assembly. When a UL grant may accommodate all pending data available for transmission, all pending SRs should be cancelled and each sr-ProhibitTimer should be stopped.

It is regarded that only PUCCH resources of the BWP activated at a time of SR transmission occasion are valid.

Any one MAC entity in which one or more SRs are pending should perform the following for each pending SR.

1> When the MAC entity has no valid PUCCH resource configured for the pending SR:
2> starts the random access procedure in the SpCell and cancels the pending SR
1> if not, in the case of the SR configuration corresponding to the pending SR:
2> when the MAC entity has an SR transmission occasion on the valid PUCCH resource for the configured SR;
2> sr-ProhibitTimer is not executed at the time of SR transmission occasion;
2> the PUCCH resource for the SR transmission occasion is not overlapped with a measurement gap;
2> the PUCCH resource for the SR transmission occasion is not overlapped with the UL-SCH resource:
3> when SR_COUNTER<sr-TransMax:
4> increases SR_COUNTER by 1
4> indicates the physical layer to signal the SR on one valid PUCCH resource for the SR;
4> starts sr-ProhibitTimer.
3> Other cases:
4> notifies the PUCCHs for all serving cells to be released to the RRC;
4> notifies the SRSs for all serving cells to be released to the RRC;
4> releases configured downlink allocation and uplink grant.
4> clears all PUSCH resources for semi-static CSI reporting.
4> starts the random access procedure in the SpCell and cancels all pending SRs.

Reference 1: When the MAC entity has more than one overlapping valid PUCCH resource for the SR transmission occasion, selection of the valid PUCCH resource for the SR for signaling the SR is achieved by UE implementation.

Reference 2: When two or more individual SRs trigger a command to signal the SR in the same valid PUCCH resource to the PHY layer in the MAC entity, SR_COUNTER for a relevant SR configuration increases only once.

The MAC entity may stop the random access procedure which is in progress (initiated by the MAC entity before the MAC PDU assembly) due to the pending SR in which the valid PUCCH resource is not configured. The random access procedure may be stopped when the MAC PDU is transmitted by using a UL grant other than a UL grant provided by a random access response, and the PDU includes a buffer status until a last event of triggering the BSR before the MAC PDU assembly or when the UL grant(s) is capable of accommodating all pending data available for transmission.

PUCCH Formats

The PUCCH format may be classified according to symbol duration, a payload size, and multiplexing. Table 10 shows the resulting PUCCH formats.

TABLE 10

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

Short-Duration PUCCH

The short-duration PUCCH may be divided into Formats 0 and 2, and a short PUCCH of 2 symbols may be constituted by repeating 1 symbol short PUCCH structure.

PUCCH Format 0 may support UCI of up to 2 bits together with multiplexing. Format 0 may be used when low latency support, small-size UCI, and low PAPR are required. Format 0 may have a structure based on cyclic shift (CS) selection without a DMRS, and occupy 1 PRB or 1 to 2 symbols. Further, up to 3 UEs (in the case of 2 bits) or 6 UEs (in the case of 1 bit) per PRB may be supported.

PUCCH Format 2 may support UCI of 2 bits or more without multiplexing. PUCCH Format 2 may be used for the low latency support, and medium or large-size UCI. PUCCH Format 2 may occupy 1 to 16 PRBs and 1 to 2 symbols. Further, PUCCH Format 2 may support one UE per PRB without multiplexing.

Long-Duration PUCCH

PUCCH Format 1 may support UCI of up to 2 bits together with multiplexing. PUCCH Format 1 may be applied to coverage support, small-size UCI, and a lot of multiplexing. PUCCH Format 1 has an LTE PF1-like structure (a structure in which OCC of a time domain and a DMRS/UCI symbol cross). PUCCH Format 1 may occupy 1 PRB, and 4 to 14 symbols, and support up to 84 UEs (12 CSs×7 OCCs) per PRB.

PUCCH Format 3 may support UCI of 2 bits or more without multiplexing. PUCCH Format 3 may be applied to the coverage support and the large-size UCI. PUCCH Format 3 may occupy 1 to 16 PRBs and 4 to 14 symbols. PUCCH Format 3 may support one UE per PRB without multiplexing.

PUCCH Format 4 may support UCI of 2 bits or more without multiplexing. PUCCH Format 4 may be used for the coverage support and the medium-size UCI. PUCCH Format 4 has an LTE PF5-like structure (TDM of DMRS and DFTed UCI with F-domain OCC). PUCCH Format 4 may occupy 1 PRB, and 4 to 14 symbols, and support up to 2 UEs (in the case of SF=2) or up to 4 UEs (in the case of SF=4) per PRB.

Physical Uplink Control Channel (PUCCH)

The PUCCH may support multiple formats, and the PUCCH formats may be classified by symbol duration, a payload size, and multiplexing. Table 11 below is a table showing an example of the PUCCH format.

TABLE 11

| Format | PUCCH length in OFDM symbols | Number of bits | Usage | Others |
|---|---|---|---|---|
| 0 | 1-2 | ≤2 | 1 | sequence selection |
| 1 | 4-14 | ≤2 | 2 | sequence modulation |
| 2 | 1-2 | >2 | 4 | CP-OFDM |
| 3 | 4-14 | >2 | 8 | DFT-s-OFDM (no UE multiplexing) |
| 4 | 4-14 | >2 | 16 | DFT-s-OFDM (Pre DFT OCC) |

The PUCCH formats of Table 11 may be divided into (1) short PUCCH and (2) long PUCCH. PUCCH formats 0 and 2 may be included in the short PUCCH, and PUCCH formats 1, 3, and 4 may be included in the long PUCCH.

The UE transmits 1 or 2 PUCCHs through the serving cell in different symbols in one slot. When two PUCCHs are transmitted in one slot, at least one of two PUCCHs has a structure of the short PUCCH. That is, in one slot, (1) transmission of the short PUCCH and the short PUCCH is possible and (2) transmission of the long PUCCH and the short PUCCH is possible, but (3) transmission of the long PUCCH and the long PUCCH is impossible.

The contents (the 3GPP system, the frame structure, the NR system, etc.) described above may be applied in combination with methods proposed in the present disclosure to be described below or may be supplemented to clarify technical features of the methods proposed in the present disclosure. Methods to be described below are just distinguished for convenience and it is needless to say that some components of any one method may be substituted with some components of another method or may be applied in combination with each other.

The following matters may be considered in relation to application of the PRACH based beam failure recovery (BFR) procedure. In the case of the PRACH based BFR procedure to which carrier aggregation (CA) is applied, any SCell may have no UL carrier, and there is a technical limit that even though the SCell has the UL carrier, a contention based PRACH may not be configured. Accordingly, the PRACH based BFR procedure to which the carrier aggregation (CA) is applied is limitedly only to the PCell or PSCell.

The following problem occurs due to an application limitation of the PRACH based BFR procedure. When a high-frequency band (e.g., 30 GHz) is operated by the SCell while the PCell is operated at a low-frequency band (e.g., 6 GHz or less), a problem in that the BFR may not be supported in a high-frequency band in which the BFR support is more importantly affected occurs.

Due to the reason, standardization for the BFR support for a secondary cell (SCell) is in progress in an Rel-16 NR MIMO work item. As a result, the following matter may be considered.

UL transmission to the corresponding SCell is impossible at least for DL only SCell. Accordingly, a (dedicated) PUCCH resource(s) used for announcing, to the BS, that the beam failure occurs in the corresponding SCell may be configured in a special cell (SpCell). The beam failure recovery request (BFRQ) for the SCell may be performed based on the configured PUCCH resources.

Hereinafter, for convenience of description, the PUCCH configured for the beam failure recovery of the SCell will be referred to as BFR-PUCCH. The terminology is used for distinguishing from another PUCCH in terms of understanding appreciation, and a technical scope is not intended to be limited through the corresponding terminology.

A role of the BFR-PRACH is to transmit, to the BS, both 'occurrence of beam failure and new beam RS (Set) information'.

On the contrary, a role of the BFR-PUCCH is to announce, to the BS, only beam failure occurrence for SCell(s)'. Detailed information related to the beam failure which occurs may be transmitted as a subsequent report.

As an example, the UE may transmit, to the BS, MAC CE (or UCI) including information on at least one of i) to iii) below as the subsequent report.

i) SCell(s) in which beam failure occurs (e.g., CC index(s))

ii) Whether there is a new beam for the SCell(s) in which the beam failure occurs iii) When there is the new beam, corresponding beam RS ID (+quality)

The iii) may include information on a quality (RSRP or SINR) of the new beam(s) according to the beam RS ID(s).

Subsequent beam report should not be continuously triggered. Specifically, after the BS receives the BFR-PUCCH, it is also possible for the BS to deactivate SCell(s) in which the BFR is configured for the corresponding UE.

Such an operation is to increase UL resource utilization. Specifically, there is also a case where tens of SCells are connected to one PCell/PSCell, and there may be many UEs sharing one PCell/PSCell UL in terms of the BS. When even such a case is considered, it is preferable to minimize a UL resource amount reserved for an SCell BFRQ usage to each UE in the PCell/PSCell. Accordingly, the BS may deactivate the SCell(s) in which the beam failure occurs after receiving the BFR-PUCCH.

When the BFR for a plurality of serving cells is configured in one UE, a channel environment and an RF configuration may be different every serving cell, and as a result, it is more preferable to independently determine whether the beam failure (BF) occurs. In this case, a beam failure detection timer (BFD timer) or a beam failure instance Max count (beamFailureInstanceMaxCount) for each serving cell may also be configured to a common value or also separately configured in units of the serving cell or a specific cell group.

In particular, when the beam failure detection timer (BFD timer) or the beam failure instance Max count (beamFailureInstanceMaxCount) for each serving cell is extensively applied even to a case where the PUCCH based BFRQ is the PCell/PSCell beam failure (e.g., the BFRQ is transmitted to the BFR-PUCCH in a situation and when there is no response, the BFRQ is transmitted to the BFR-PRACH), the BFD timer/beam FailureInstanceMaxCount value to be applied to the PCell/PSCell may be configured separately from to be applied to the SCell(s). In this case, it is considered that the PUCCH based BFR operation is not normally performed in the PCell/PSCell, the PRACH based BFR operation may be applied as back-up. Specifically, the PUCCH based BFR operation may be triggered by monitoring the BFD for a shorter time/number of times than the SCell(s). Accordingly, a BFD timer/beam FailureInstanceMaxCount value to be applied to the PCell/PSCell may be configured to be smaller than a BFD timer/beamFailureInstanceMaxCount value to be applied to the SCell(s).

[Proposal 1]

The BS may be separately configured, to the UE, each of the BFD timer/beamFailureInstanceMaxCount value to be applied to the primary cell (PCell)/primary secondary cell (PSCell) and the timer/beamFailureInstanceMaxCount to be applied to the secondary cell(s) (SCell(s)) (with respect to the same or different BFR-PUCCH resources).

It is preferable that the beam failure detection (BFD) process operates independently for each serving cell regardless of whether the BFD timer/beam FailureInstanceMaxCount is a common value for each serving cell. In this case, when the beam failure instances (BFIs) for a plurality of serving cells occur the same/adjacent time point, ambiguity for when/how the UE should transmit the PUCCH occurs.

For example, it is assumed that a beam failure instance (BFI) count for Scell #0 becomes (or exceeds) a beam failure instance Max count (beam FailureInstanceMaxCount) at a specific time point and the UE thus transmits the BFR-PUCCH. The beam failure instance (BFI) count for Scell #1 becomes (or exceeds) the beam failure instance Max count (beamFailureInstanceMaxCount) at a subsequent time point (e.g., a time point within a short time from the BFR-PUCCH transmission time point) and the UE should be able to thus transmit the BFR-PUCCH once again. In duplicated transmission of the beam failure recovery request (BFRQ), a problem of power waste of the UE and a problem in that the BS also unnecessarily receives the same message twice occur.

Accordingly, the present disclosure proposes a transmission time point of the beam failure recovery request (BFRQ) in the case of i) and ii) below.

i) Case where the BFI count for a specific cell is equal to or more than the beam failure instance Max count (beamFailureInstanceMaxCount) upon beam failure detection (BFD) for a plurality of serving cells ii) Case where the BFI count is equal to or more than 1 (i.e., the value of the BFI counter is equal to or more than 1) and less than the beam failure instance Max count (beamFailureInstanceMaxCount) (i.e., while the BFD operation is performed even for another cell) even for one cell among other cells at a time point when the i) is satisfied, In the above case, the UE may transmit the BFRQ at a time point of 1) or 2) below (after waiting up to the time point of 1) or 2) below).

1) Case where the BFI count for all cells configured for the corresponding BFR becomes 0 (i.e., BFI counter=0) (e.g., case where the BFD timer for the cell which is performing the BFD expired)

2) Case where the BFI count for all cells configured for the corresponding BFR is equal to or more than beam FailureInstanceMaxCount

[Proposal 2]

When one UL resource is used for the BFRQ usage for the plurality of serving cells, the UE independently counts the BFI for each serving cell, but only in a case where the value of the BFI counter for each of the plurality of serving cells is equal to or more than beam FailureInstanceMaxCount or 0 and in a case where there is at least one serving cell having the BFI counter value which is equal to more than beamFailureInstanceMaxCount, the UE transmits the BFRQ through the corresponding UL resource.

In this case, the UE transmits a cell ID(s) of the serving cell(s) corresponding to the beamFailureInstanceMaxCount or more, as a failed serving cell ID(s), via subsequent (MAC-CE or UCI based) report information.

In the operation, when there are a serving cell with BFI counter beamFailureInstanceMaxCount and a serving cell with 0<BFI counter<beamFailureInstanceMaxCount, and the UE thus holds the beam failure recovery request (BFRQ), the UE may be configured to stop or reset the BFD timer for the serving cell with BFI count beamFailureInstanceMaxCount, or extend the BFD timer by a specific time. Therefore, the BFI counter may be prevented from being reset due to the expiration of the BFD timer.

Effects according to the embodiment are as follows. When the UE is performing a BFD process for another cell during beam failure detection (BFD) for a specific cell, the corresponding UE transmits the beam failure recovery request (BFRQ) only once after waiting for a predetermined time to save the power of the UE.

Hereinafter, a transmission time point of the beam failure recovery request (BFRQ) according to Proposal 2 above will be described in detail with reference to FIGS. 14 and 15.

FIG. 14 is a diagram for describing an example of a time point of transmitting a beam failure recovery request according to an embodiment of the present disclosure. FIG. 15 is a diagram for describing another example of the time point of transmitting the beam failure recovery request according to an embodiment of the present disclosure.

Referring to FIGS. 14 and 15, since the value of the BFI counter for Scell #1 is equal to or more than 1 (i.e., cnt=2) at a time point (o) when the BF occurs for Scell #0, the UE transmits the beam failure recovery request (BFRQ) after waiting without sending the beam failure recovery request (BFRQ) immediately in ③ (④).

In particular, since there is a high probability that a plurality of Scells will be simultaneously placed in the BF situation in the case of secondary cells adjacent to a frequency side or configured/supported by the same RF/antenna or secondary cells (Scells) which belong to an intra-band (e.g., ② of FIG. 14), the embodiment has an effect which prevents the beam failure recovery request (BFRQ) from being unnecessarily transmitted in such a case.

In applying the scheme, in the case where the BFI counter for another serving cell is equal to or more than 1 as the case where the BFI counter for a specific serving cell is equal to or more than beamFailureInstanceMaxCount, the following problem may occur.

Specifically, in a case where the BFD timer for the serving cell in which the BFI counter is equal to or more than 1 is configured to be long and the BFI does not occur any longer in the corresponding serving cell, a problem in that transmission of the beam failure recovery request (BFRQ) is for an excessively long time may occur.

Accordingly, it may be more preferable that the method of Proposal 2 is applied only for a predetermined time, and when the predetermined time elapsed, the beam failure recovery request (BFRQ) for the serving cell in which the BFI counter is equal to or more than beam FailureInstanceMaxCount is first transmitted. Accordingly, the following method is proposed.

[Proposal 2.1]

When a condition is not satisfied in which the BFI counter value for each of other serving cell(s) is 0 or is equal to or more than beamFailureInstanceMaxCount for a specific time based on a time point when the serving cell with counter beam FailureInstanceMaxCount, among a plurality of serving cells sharing a BFRQ UL resource, starts to exist, the UE transmits the beam failure recovery request (BFRQ).

In applying the operation, when the serving cell(s) with counter beamFailureInstanceMaxCount additionally exists before a time point (e.g., "UL-SCH transmission"— "UE processing time") of generating a MAC protocol data unit (PDU) for UL-SCH transmission (e.g., multiplexing and assembly), the UE may constitute a failed Scell ID(s) including the corresponding serving cell(s).

Hereinafter, the transmission of the BFRQ according to Proposal 2.1 above will be described with reference to FIG. 16.

FIG. 16 is a diagram for describing yet another example of the time point of transmitting the beam failure recovery request according to an embodiment of the present disclosure.

When the UE waits for whether to declare the BF for Scell #1 by a specific time based on a BF declaration time point (o) for Scell #0, and then the corresponding time elapsed (o), the UE may transmit the BFR-PUCCH (o). In this case, when the BFI counter value of Scell #1 is equal to or more than beamFailureInstanceMaxCount (cnt=cnt_max) after the corresponding determination time point or after the BFR-PUCCH transmission time point (o), the UE may also report the beam failure for the corresponding Scell via the UL-SCH allocated for the beam report usage together (o) (i.e., the UE reports the beam failure as a beam fail situation for both Scell #0 and Scell #1).

The following discloses a BFD and BFRQ related MAC procedure to be changed and applied when applying Proposal 2. In the embodiment, modified/added procedures 3 and 4 are the most core part, and in particular, the proposal scheme may be applied for each cell group in a dual connectivity (DC) situation. That is, since different PUCCH resources may be used among cell groups in the DC situation (e.g., cells which belong to cell group #0 and cells which belong to cell group #1 use PCell PUCCH and PSCell PUCCH, respectively), the UE transmits the BFRQ after waiting until all (S)cells are in a BFD completion state or in a state not of performing the BFD within the same cell group, but may need to wait by checking whether (S)cells which belong to different cell groups are in a BFD completion or incompletion state.

Since the scheme may be applied even among the cell groups (e.g., all transmit the BFRQ by using the PCell PUCCH regardless of the cell group), the BS may explicitly configure whether to apply the scheme only within the cell group or among all cell groups (through an RRC message) or may be configured to implicitly judge/determine whether the BFR PUCCH resource is configured in both the PSCell and the PCell.

Similarly, when there is the PUCCH-SCell (section 9, TS 38.213), a cell group that transmits the PUCCH to the PUCCH-SCell and a cell group that transmits the PUCCH to the PCell may be separately constituted, and in this case, the above proposal schemes (inter-/intra-cell-group wise operation) may be applied.

For each serving cell of a serving cell list of a (SCell) BFR configuration, the MAC entity should perform the following procedure.

1> Case where a beam failure instance indication for the serving cell is received from a lower layer:
2> starts or restarts beam FailureDetectionTimer for the serving cell;
2> increases BFI_COUNTER for the serving cell by 1;
2> Case where when BFI_COUNTER>=beam FailureInstanceMaxCount:
3> Case where BFI_COUNTER=0 or BFI_COUNTER>=beamFailureInstanceMaxCount for different serving cells constituted for the (Scell) BFR (which exist in the same cell group):
4> starts an SR procedure for the (Scell) BFR in the (corresponding) SpCell.
3> Otherwise:
4> stops beamFailureDetectionTimer (in a case where beamFailureDetectionTimer is configured) for the serving cell.
1> When beamFailureDetectionTimer for the serving cell expired; or
1> Case where beamFailureDetectionTimer, beamFailureInstanceMaxCount or any of the reference signals used for beam failure detection is reconfigured for the serving cell by a higher layer:
2> configures BFI_COUNTER of the serving cell to 0.
1> Case where the SR procedure for (SCell) BFR is successfully completed:
2> configures BFI_COUNTER (ex1: for the serving cell ex2: for the all failed serving cells) to 0.
2> stops beamFailureRecoveryTimer (when configured) (ex1: for the serving cell, ex2: for the all failed serving cells).
2> regards that the beam failure recovery procedure (ex1: for the serving cell, ex2: for the all failed serving cells) is successfully completed.

In the embodiment, the operation of performing the BFRQ based on the PUCCH is interpreted as an operation of triggering a scheduling request for transmission of the MAC-CE (or UCI) for the BFR usage in terms of an MAC sub layer operation (i.e., "initiate a SR procedure for (SCell) BFR").

Further, the scheme proposed in the present disclosure may be limitedly applied only among the serving cells in the same band or a set of the serving cells to which the scheme is to be applied may also be separately configured by the BS.

In terms of implementation, the operations of the BS/UE according to the above-described embodiments (e.g., the above-described proposal methods (operations related to the beam failure recovery based on at least one of Proposals 1/2/2-1) may be processed by devices (e.g., processors 102 and 202 in FIG. 21) in FIGS. 20 to 24 to be described below.

Further, the operations (e.g., operations related to the beam failure recovery based on at least one of Proposals 1/2/2.1) of the BS/UE according to the above-described embodiments may be stored in memories (e.g., reference numerals 104 and 204 in FIG. 21) in the form of a command/program (e.g., instruction or executable code) for driving at least one processor (e.g., reference numerals 102 and 202 in FIG. 21).

FIG. 17 illustrates an example of a signaling between a UE and a BS to which a method proposed in the present disclosure may be applied.

Specifically, FIG. 17 illustrates an example of a signaling between a user equipment (UE) and a base station (BS) based on the above-described proposal method (e.g., Proposal 1/Proposal 2/Proposal 2-1, etc.) (herein, the UE/BS is just an example, and may be replaced and applied with various devices as described below in FIGS. 20 to 24). FIG. 17 is just for convenience of the description and does not limit the scope of the present disclosure. Further, some step(s) illustrated in FIG. 17 may be omitted according to a situation and/or a configuration.

The UE may receive a BFR related Config., i.e., BFR related configuration information from the BS (S1710). For example, the BFR related configuration information may include configuration information related to the operations of Proposals 1/2/2-1. The BFR related configuration information may include configuration information for a (PUCCH) resource configuration, a timer, a counter, etc., for the BFR. The BFR related configuration may be delivered through a higher layer signaling (e.g., RRC signaling), etc.

For example, the operation of the UE (reference numeral 100/200 in FIGS. 20 to 24) in step S1710 described above, which receives the BFR related Config. from the BS may be implemented by devices in FIGS. 20 to 24 to be described below. For example, referring to FIG. 21, one or more processors 102 may control one or more transceivers 106 and/or one or more memories 104 so as to receive the BFR related Config. DCI and one or more transceivers 106 may receive the BFR related Config. from the BS.

The UE may transmit, to the BS, a PUCCH (e.g., BFR-PUCCH, BFR related PUCCH) when a specific event occurs (S1720). For example the UE may transmit, to the BS, a PUCCH (e.g., BFR-PUCCH, BFR related PUCCH) based on Proposals 1/2/2-1. As an example, the UE may determine the transmission time of the BFR-PUCCH and/or whether to transmit the BFR-PUCCH, by considering the value of the BFI counter for each serving cell in a situation in which one or more serving cells are supported. As an example, prior to the transmission of the BFR-PUCCH, the operation in the MAC layer described in Proposals 1/2/2-1 described above may be preferentially performed.

For example, the operation of the UE (reference numeral 100/200 in FIGS. 20 to 24) in step S1720 described above, which transmits the PUCCH to the BS may be implemented by the devices in FIGS. 20 to 24 to be described below. For example, referring to FIG. 21, one or more processors 102 may control one or more transceivers 106 and/or one or more memories 104 so as to transmit the PUCCH and one or more transceivers 106 may transmit the PUCCH to the BS.

The UE may receive, from the BS, a UL grant for scheduling a PUSCH (e.g., BFR related PUSCH) (S1730). For example, referring to Proposals 1/2/2-1 described above, the PUSCH may be a PUSCH for delivering MAC-CE (or UCI) including a BFR related report (e.g., information (e.g., CC index(s) on SCell(s) in which the beam failure occurs)) and/or whether there is the new beam for the corresponding SCell(s) and/or a corresponding beam RS ID (and/or a quality (e.g., RSRP/SINR) of the corresponding beam) when there is the new beam. That is, the UE may receive scheduling information of the PUSCH for delivering the MAC-CE (or UCI) including the BFR related report through a PDCCH (i.e., a PDCCH for the UL grant).

For example, the operation of the UE (reference numeral 100/200 in FIGS. 20 to 24) in step S1720 described above, which receives the UL grant for the PUSCH scheduling from the BS may be implemented by the devices in FIGS. 20 to 24 to be described below. For example, referring to FIG. 21, one or more processors 102 may control one or more transceivers 106 and/or one or more memories 104 so as to receive the UL grant for the PUSCH scheduling, and one or more transceivers 106 may receive the UL grant for the PUSCH scheduling from the BS.

The UE may transmit, to the BS, the PUSCH (e.g., BFR related PUSCH) scheduled based on the UL grant (S1740). For example, referring to Proposals 1/2//2-1 described above, the UE may transmit, to the BS, the MAC-CE (or UCI) including the BFR related report through the PUSCH.

For example, the operation of the UE (reference numeral 100/200 in FIGS. 20 to 24) in step S1740 described above, which transmits the PUSCH scheduled based on the UL grant to the BS may be implemented by the devices in FIGS. 20 to 24 to be described below. For example, referring to FIG. 21, one or more processors 102 may control one or more transceivers 106 and/or one or more memories 104 so as to transmit the PUSCH scheduled based on the UL grant, and one or more transceivers 106 may transmit the PUSCH scheduled based on the UL grant to the BS.

As mentioned above, the BS/UE signaling and operation (e.g., Proposal 1/2/2-1/FIG. 17, etc.) may be implemented by the devices (e.g., FIGS. 20 to 24) to be described below. For example, the BS may correspond to a transmitting device/first device and the UE may correspond to a receiving device/second device, and in some cases, an opposite case thereto may also be considered. For example, the BS/UE signaling and operation (e.g., Proposals 1/2/2-1/FIG. 17, etc.) may be processed by one or more processors 102 and 202 in FIG. 21 and the BS/UE signaling and operation (e.g., Proposals 1/2/2-1/FIG. 17, etc.) may be stored in a memory (e.g., one or more memories 104 and 204 in FIG. 21) in the form of a command/program (e.g., instruction and executable code) for driving at least one processor (e.g., reference numerals 102 and 202) in FIG. 21.

Hereinafter, the above-described embodiments will be described in detail with reference to FIG. 18 in terms of the operation of the UE. Methods to be described below are just distinguished for convenience and it is needless to say that some components of any one method may be substituted with some components of another method or may be applied in combination with each other.

FIG. 18 is a flowchart for describing a method of performing, by a UE, a beam failure recovery procedure in a wireless communication system according to an embodiment of the present disclosure.

Referring to FIG. 18, a method for performing, by a UE, a beam failure recovery procedure in a wireless communication system according to an embodiment of the present disclosure includes receiving configuration information related to a PUCCH (S1810), transmitting the PUCCH based on the configuration information (S1820), and transmitting a message including information related to beam failure recovery (S1830).

In S1810, the UE receives, from the BS, configuration information related to a physical uplink control channel (PUCCH). The configuration information may be based on the BFR related configuration information of FIG. 17. As an example, the configuration information may include at least one of a resource configuration of the PUCCH, a beam failure detection (BFD) timer, or a beam failure instance Max counter. The configuration information may include 1) configuration information related to a resource of the PUCCH and 2) configuration information related to the beam failure detection (BFD) timer and/or the beam failure instance Max counter.

According to S1810, the operation of the UE (reference numeral 100/200 in FIGS. 20 to 24) which receives configuration information related to a physical uplink control channel (PUCCH) from the BS (reference numeral 100/200 in FIGS. 20 to 24) may be implemented by the devices in FIGS. 20 to 24. For example, referring to FIG. 21, one or more processors 102 may control one or more transceivers 106 and/or one or more memories 104 so as to receive the configuration information related to the PUCCH from the BS 200.

In S1820, the UE transmits, to the BS, the PUCCH based on the configuration information. The PUCCH is related to beam failure recovery (BFR) of at least one secondary cell (SCell). The transmission of the PUCCH may be based on S1720 of FIG. 17 above.

According to S1820 described above, the operation of the UE (reference numeral 100/200 in FIGS. 20 to 24) which transmits, to the BS (reference numeral 100/200 in FIGS. 20 to 24), the PUCCH based on the configuration information may be implemented by the devices in FIGS. 20 to 24. For example, referring to FIG. 21, one or more processors 102 may control one or more transceivers 106 and/or one or more memories 104 so as to transmit, to the BS 200, the PUCCH based on the configuration information.

In S830, the UE transmits a message including information related to the beam failure recovery (BFR).

According to an embodiment, the message including the information related to the beam failure recovery (BFR) may be related to a beam failure detected before a specific time point.

According to an embodiment, the message may be based on a medium access control-control element (MAC-CE).

The specific time point may be related to a multiplexing and assembly operation related to the MAC-CE.

The MAC-CE may include information related to at least one of an ID of the at least one secondary cell (SCell), whether a new beam related to the beam failure exists, or an ID of a reference signal (RS) related to the new beam.

The beam failure detected before the specific time point may include a beam failure of the secondary cell detected after the PUCCH transmission.

According to an embodiment, the beam failure may be detected based on a case where a count of a beam failure instance (BFI) is equal to or larger than a beam failure instance Max count.

The beam failure instance Max count may be configured for each secondary cell (SCell).

According to S1830 described above, the operation of the UE (reference numeral 100/200 in FIGS. 20 to 24) which transmits, to the BS (reference numeral 100/200 in FIGS. 20 to 24), the message including the information related to the BFR may be implemented by the devices in FIGS. 20 to 24. For example, referring to FIG. 21, one or more processors 102 may control one or more transceivers 106 and/or one or more memories 104 so as to transmit, to the BS 200, the message including the information related to the BFR.

The method may further include receiving an uplink (UL) grant. In the receiving of the UL grant, the UE receives, from the BS, the UL grant related to the PUCCH. The message including the information related to the beam failure recovery (BFR) may be transmitted based on a physical uplink shared channel (PUSCH) scheduled by the UL grant. The embodiment may be based on S1730 and S1740 in FIG. 17.

According to the receiving of the UL grant, the operation of the UE (reference numeral 100/200 in FIGS. 20 to 24) which receives the UL grant related to the PUCCH from the BS (reference numeral 100/200 in FIGS. 20 to 24) may be implemented by the devices in FIGS. 20 to 24. For example, referring to FIG. 21, one or more processors 102 may control one or more transceivers 106 and/or one or more memories 104 so as to receive, from the BS 200, the UL grant related to the PUCCH.

Hereinafter, the above-described embodiments will be described in detail with reference to FIG. 19 in terms of the operation of the BS. Methods to be described below are just distinguished for convenience and it is needless to say that some components of any one method may be substituted with some components of another method or may be applied in combination with each other.

FIG. 19 is a flowchart for describing a method of performing, by a BS, a beam failure recovery procedure in a wireless communication system according to another embodiment of the present disclosure.

Referring to FIG. 19, a method for performing, by a BS, a beam failure recovery procedure in a wireless communication system according to another embodiment of the present disclosure includes transmitting configuration information related to a PUCCH (S1910), receiving the PUCCH based on the configuration information (S1920), and receiving a message including information related to beam failure recovery (S1930).

In S1910, the BS transmits, to the UE, configuration information related to a physical uplink control channel (PUCCH). The configuration information may be based on the BFR related configuration information of FIG. 17. As an example, the configuration information may include at least one of a resource configuration of the PUCCH, a beam failure detection (BFD) timer, or a beam failure instance Max counter. The configuration information may include 1) configuration information related to a resource of the PUCCH and 2) configuration information related to the beam failure detection (BFD) timer and/or the beam failure instance Max counter.

According to S1910, the operation of the BS (reference numeral 100/200 in FIGS. 20 to 24) which transmits configuration information related to a physical uplink control channel (PUCCH) from the UE (reference numeral 100/200 in FIGS. 20 to 24) may be implemented by the devices in FIGS. 20 to 24. For example, referring to FIG. 21, one or more processors 202 may control one or more transceivers 206 and/or one or more memories 204 so as to transmit the configuration information related to the PUCCH from the UE 100.

In S1920, the BS receives, from the UE, the PUCCH based on the configuration information. The PUCCH is related to beam failure recovery (BFR) of at least one secondary cell (SCell). The transmission of the PUCCH may be based on S1720 of FIG. 17 above.

According to S1920 described above, the operation of the BS (reference numeral 100/200 in FIGS. 20 to 24) which receives, from the UE (reference numeral 100/200 in FIGS. 20 to 24), the PUCCH based on the configuration information may be implemented by the devices in FIGS. 20 to 24. For example, referring to FIG. 21, one or more processors 202 may control one or more transceivers 206 and/or one or more memories 204 so as to receive, from the UE 100, the PUCCH based on the configuration information.

In S1930, the BS receives a message including information related to the beam failure recovery (BFR).

According to an embodiment, the message including the information related to the beam failure recovery (BFR) may be related to a beam failure detected before a specific time point.

According to an embodiment, the message may be based on a medium access control-control element (MAC-CE).

The specific time point may be related to a multiplexing and assembly operation related to the MAC-CE.

The MAC-CE may include information related to at least one of an ID of the at least one secondary cell (SCell), whether a new beam related to the beam failure exists, or an ID of a reference signal (RS) related to the new beam.

The beam failure detected before the specific time point may include a beam failure of the secondary cell detected after the PUCCH reception.

According to an embodiment, the beam failure may be detected based on a case where a count of a beam failure instance (BFI) is equal to or larger than a beam failure instance Max count.

The beam failure instance Max count may be configured for each secondary cell (SCell).

According to S1930 described above, the operation of the BS (reference numeral 100/200 in FIGS. 20 to 24) which receives, from the UE (reference numeral 100/200 in FIGS. 20 to 24), the message including the information related to the BFR may be implemented by the devices in FIGS. 20 to 24. For example, referring to FIG. 21, one or more processors 202 may control one or more transceivers 206 and/or one or more memories 204 so as to receive, from the UE 100, the message including the information related to the BFR.

The method may further include transmitting an uplink (UL) grant. In the transmitting of the UL grant, the BS transmits, to the UE, the UL grant related to the PUCCH. The message including the information related to the beam failure recovery (BFR) may be transmitted based on a physical uplink shared channel (PUSCH) scheduled by the UL grant. The embodiment may be based on S1730 and S1740 in FIG. 17.

According to the transmitting of the UL grant, the operation of the BS (reference numeral 100/200 in FIGS. 20 to 24) which transmits the UL grant related to the PUCCH to the UE (reference numeral 100/200 in FIGS. 20 to 24) may be implemented by the devices in FIGS. 20 to 24. For example, referring to FIG. 21, one or more processors 202 may control one or more transceivers 206 and/or one or more memories 204 so as to transmit, to the UE 100, the UL grant related to the PUCCH.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 20 illustrates a communication system 1 applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 21 illustrates wireless devices applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 22 illustrates a signal process circuit for a transmission signal.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 23 illustrates another example of a wireless device applied to the present disclosure.

The wireless device may be implemented in various forms according to a use-case/service (refer to FIG. 20). Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 24 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of the method for performing the beam failure recovery procedure in the wireless communication system, and the device therefor according to the embodiment of the present disclosure are described below.

According to an embodiment of the present disclosure, a beam failure recovery procedure is initiated based on a physical uplink control channel (PUCCH). Beam failure recovery can be performed based on the PUCCH, so the beam failure recovery (BFR) can be effectively supported even to a secondary cell (SCell). In particular, when a beam failure occurs in a secondary cell (SCell) for a high-frequency band (e.g., 30 GHz), the beam failure recovery can be more effectively performed.

According to an embodiment of the present disclosure, a message including information related to the beam failure recovery is transmitted. The message is related to a beam failure detected before a specific time point. Accordingly, after the beam failure is first detected, a subsequent report (i.e., the message) related to the beam failure is transmitted, which includes the information related to the beam failure detected before the specific time point, so power of a UE can be reduced and the beam failure recovery procedure can be improved in terms of signaling overhead.

In the embodiments described above, the components and the features of the present disclosure are combined in a predetermined form. Each component or feature should be considered as an option unless otherwise expressly stated. Each component or feature may be implemented not to be associated with other components or features. Furthermore, the embodiment of the present disclosure may be configured by associating some components and/or features. The order of the operations described in the embodiments of the present disclosure may be changed.

Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

The invention claimed is:

1. A method performed by a user equipment (UE) in a wireless communication system, the method comprising:
receiving configuration information that includes a set of Physical Uplink Control Channel (PUCCH) resources for a scheduling request (SR);
based on a beam failure recovery (BFR) for a first Secondary Cell (SCell) being triggered, transmitting a PUCCH based on the PUCCH resources for the SR used for requesting Uplink-Shared Channel (UL-SCH) resources; and
based on the UL-SCH resources being available, transmitting a BFR medium access control control element (MAC CE) that includes information indicating a beam failure detection for one or more SCells,
wherein the BFR MAC CE is generated based on a multiplexing and assembly procedure related to a MAC Protocol Data Unit (PDU), and
wherein the one or more SCells include i) the first SCell and ii) at least one second SCell for which at least one BFR is triggered before the multiplexing and assembly procedure related to the MAC PDU.

2. The method of claim 1, wherein the BFR MAC CE includes information related to one or more Reference Signals (RSs) identifying one or more candidate beams.

3. The method of claim 1, wherein a beam failure is detected based on a value of a beam failure instance (BFI) counter being greater than or equal to a beam failure instance Max count.

4. The method of claim 3, wherein the BFI counter is set for each serving cell, and
wherein, based on i) a value of the BFI counter for a serving cell being greater than or equal to the beam failure instance Max count and ii) the serving cell being a SCell;
a BFR for the SCell is triggered.

5. A user equipment (UE) configured to operate in a wireless communication system, the UE comprising:
one or more transceivers;
one or more processors controlling the one or more transceivers; and
one or more memories operably connectable to the one or more processors, and storing instructions, based on being executed by the one or more processors, configure the one or more processors to perform operations comprising:
receiving configuration information that includes a set of Physical Uplink Control Channel (PUCCH) resources for a scheduling request (SR);
based on a beam failure recovery (BFR) for a first Secondary Cell (SCell) being triggered, transmitting a PUCCH based on the PUCCH resources for the SR used for requesting Uplink-Shared Channel (UL-SCH) resources; and
based on the UL-SCH resources being available, transmitting a BFR medium access control control element (MAC CE) that includes information indicating a beam failure detection for one or more SCells,
wherein the BFR MAC CE is generated based on a multiplexing and assembly procedure related to a MAC Protocol Data Unit (PDU), and
wherein the one or more SCells include i) the first SCell and ii) at least one second SCell for which at least one BFR is triggered before the multiplexing and assembly procedure related to the MAC PDU.

6. The UE of claim 5, wherein the BFR MAC CE includes information related to one or more Reference Signals (RSs) identifying one or more candidate beams.

7. A base station configured to operate in a wireless communication system, the base station comprising:
one or more transceivers;
one or more processors controlling the one or more transceivers; and
one or more memories operably connectable to the one or more processors, and storing instructions, based on being executed by the one or more processors, configure the one or more processors to perform operations comprising:
transmitting configuration information that includes a set of Physical Uplink Control Channel (PUCCH) resources for a scheduling request (SR);
based on a beam failure recovery (BFR) for a first Secondary Cell (SCell) being triggered, receiving a PUCCH based on the PUCCH resources for the SR used for requesting Uplink-Shared Channel (UL-SCH) resources; and
based on the UL-SCH resources being available, receiving a BFR medium access control control element (MAC CE) that includes information indicating a beam failure detection for one or more SCells, wherein the BFR MAC CE is generated based on a multiplexing and assembly procedure related to a MAC Protocol Data Unit (PDU), and wherein the one or more SCells include i) the first SCell and ii) at least one second SCell for which at least one BFR is triggered before the multiplexing and assembly procedure related to the MAC PDU.

* * * * *